(12) United States Patent  
Liu et al.

(10) Patent No.: US 10,860,641 B2
(45) Date of Patent: Dec. 8, 2020

(54) METHOD, APPARATUS, AND ELECTRONIC DEVICES FOR SEARCHING IMAGES

(71) Applicant: Alibaba Group Holding Limited, Grand Cayman (KY)

(72) Inventors: Yu Liu, Hangzhou (CN); Ruitao Liu, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 133 days.

(21) Appl. No.: 15/942,157

(22) Filed: Mar. 30, 2018

(65) Prior Publication Data

US 2018/0285386 A1 Oct. 4, 2018

(30) Foreign Application Priority Data

Mar. 31, 2017 (CN) .......................... 2017 1 0208412

(51) Int. Cl.
*G06K 9/00* (2006.01)
*G06K 9/46* (2006.01)
(Continued)

(52) U.S. Cl.
CPC ........ *G06F 16/5838* (2019.01); *G06F 16/583* (2019.01); *G06F 16/951* (2019.01);
(Continued)

(58) Field of Classification Search
CPC ........ G06N 3/08; G06N 3/02; G06F 17/2785; G06F 17/274; G06F 17/277;
(Continued)

(56) References Cited

U.S. PATENT DOCUMENTS 7,099,860 B1 8/2006 Liu et al.
8,682,095 B2 3/2014 Lee et al.
(Continued)

FOREIGN PATENT DOCUMENTS

CN 105975611 A 9/2016

OTHER PUBLICATIONS

He, et. al., "Deep Residual Learning for Image Recognition", Dec. 10, 2015, Retrieved from: https://arxiv.org/pdf/1512.03385.pdf, 12 pages.

(Continued)

*Primary Examiner* — Kenny A Cese
(74) *Attorney, Agent, or Firm* — Lee & Hayes, P.C.

(57) ABSTRACT

Methods, apparatuses and electronic devices for generating a feature vector, as well as searching methods, apparatuses and electronic devices are disclosed. The method for generating a feature vector includes: acquiring data information; extracting a semantic feature from the data information, to acquire semantic feature information; and acquiring a feature vector of the data information by using a preset function, with the semantic feature information as a parameter. The technical solution identifies picture information by recognizing semantics of image information and matching the semantics of the image information with natural language descriptions. Different from conventional image search schemes of existing search engines, this technical solution does not need to retrieve a text description of image information, but retrieves and identifies images based on the content of the image information. Therefore, results with higher accuracy may be returned compared with the existing text-based image search.

9 Claims, 11 Drawing Sheets

(51) Int. Cl.
*G06F 40/30* (2020.01)
*G06F 16/583* (2019.01)
*G06N 3/08* (2006.01)
*G06F 16/951* (2019.01)
*G06K 9/62* (2006.01)

(52) U.S. Cl.
CPC ......... *G06F 40/30* (2020.01); *G06K 9/00456* (2013.01); *G06K 9/00684* (2013.01); *G06K 9/4628* (2013.01); *G06K 9/6267* (2013.01); *G06N 3/08* (2013.01); *G06N 3/084* (2013.01)

(58) Field of Classification Search
CPC ............. G06F 16/3329; G06F 16/3344; G06F 16/3347; G06F 17/2881; G06F 40/30; G06F 40/279; G06F 40/284; G06K 9/00684; G06K 9/66; G06K 9/00456; G06K 9/6232; G06T 2207/20084; G06T 2207/20081
See application file for complete search history.

(56) References Cited

U.S. PATENT DOCUMENTS

| | | |
|---|---|---|
| 2005/0114325 A1 | 5/2005 | Liu et al. |
| 2008/0027917 A1 | 1/2008 | Mukherjee et al. |
| 2015/0036921 A1 | 2/2015 | Lu et al. |
| 2015/0331929 A1 | 11/2015 | El-Saban et al. |
| 2016/0071010 A1 | 3/2016 | Tian et al. |
| 2016/0342895 A1 | 11/2016 | Gao et al. |
| 2017/0061250 A1 | 3/2017 | Gao et al. |
| 2017/0228361 A1* | 8/2017 | Zhang ................. G06F 16/337 |
| 2018/0182376 A1* | 6/2018 | Van Gysel ............. G10L 21/10 |
| 2018/0260956 A1* | 9/2018 | Huang ................. G06K 9/6271 |
| 2018/0293516 A1 | 10/2018 | Lavid Ben Lulu et al. |

OTHER PUBLICATIONS

PCT Search Report and Written Opinion dated Jun. 27, 2018, for PCT Application No. PCT/US18/25555, 10 pages.

* cited by examiner

EXTRACT SEMANTIC FEATURE FROM DATA INFORMATION BY USING PRESET NEURAL NETWORK MODEL
S1042

FIG. 1B

METHOD, APPARATUS, AND ELECTRONIC DEVICES FOR SEARCHING IMAGES

CROSS REFERENCE TO RELATED PATENT APPLICATIONS

This application claims priority to Chinese Patent Application No. 201710208412.8 filed on 31 Mar. 2017 and entitled "METHOD, APPARATUS, AND ELECTRONIC DEVICE FOR GENERATING AND SEARCHING FEATURE VECTOR," which is incorporated herein by reference in its entirety.

TECHNICAL FIELD

The present disclosure relates to the field of deep learning technologies, and, more particularly, to methods for generating a feature vector and searching methods. The present disclosure also relates to apparatuses and electronic devices for generating a feature vector, as well as searching apparatuses and electronic devices.

BACKGROUND

With the development of the Internet and e-commerce, an increasingly larger amount of image data is being generated, and the demand of effective image data retrieval is also growing. Existing image retrieval technologies mainly depend on text. For example, a keyword-based search relies on retrieval of text descriptions of images. In the existing text-based image search, corresponding natural language descriptions (which may be obtained by extracting the context of an image, the title of a document file, etc.) are established for all images in a database of a search engine. When a user inputs a search term, similarity degrees between the search term and the natural language descriptions corresponding to the images are calculated and used as similarity degrees between the search term and the related images, so that the images are identified and sorted according to the similarity degrees.

As shown from the above, in a text-based image search, images corresponding to a search term are found by matching the search term with text descriptions such as titles and attributes of the images. Therefore, only image data provided with a corresponding text description (of the image) may be retrieved. In addition, as an intermediate in a text-based image search, text descriptions corresponding to images may only reveal partial or one-sided information of the images. Therefore, the images found are inaccurate as the returned results are predominantly affected by the precision and completeness of the text descriptions of the images.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides a method comprising:
acquiring a search term;
analyzing image features of an image to obtain a content represented by the image;
comparing the search term with the content; and
determining that the image is a search result of the search term based on a result of the comparing.

For example, the acquiring the search term includes converting the search term into a first feature vector; the analyzing the image features of the image to obtain the content includes converting the image features into a second feature vector that represents the content; and the comparing the search term with the content includes comparing the first feature vector with the second feature vector.

For example, the determining that the image is the search result of the search term based on the result of the comparing includes:
determining that the image is the search result in response to determining that a similarity degree between the first feature vector and the second feature vector reaches a threshold.

For example, the analyzing the image features of the image to obtain the content include:
extracting the image features of the image without relying on a text description associated with the image.

For example, the analyzing the image features of the image to obtain the content include:
determining a focus of the image; and
determining the content of the image based on the focus of the image.

For instance, the determining the focus of the image includes determining a main part of the image.

For example, the analyzing image features of an image to obtain a content represented by the image includes:
splitting data information based on a feature of a preset level of a neural network model; and
acquiring each piece of split semantic feature information.

For example, the method further comprises using a hyperbolic tangent function with a preset feature matrix in the neural network model; normalizing a product of each piece of the semantic feature information and the preset fifth neural parameter by using a norm L1norm; and normalizing an output of the neural network model by using a norm L2norm.

For example, the converting the search term into a first feature vector includes:
segmenting the search term; and
applying an embedding layer to obtain the first feature vector based on a neural network model.

The present disclosure provides a method for generating a feature vector and a searching method, which may solve the above-mentioned problems in the conventional techniques. The present disclosure also relates to an apparatus for generating a feature vector and an associated electronic device, as well as a searching apparatus and an associated electronic device.

The present disclosure provides a method for generating a feature vector. The method includes:
acquiring data information;
extracting a semantic feature from the data information, to acquire semantic feature information; and
acquiring a feature vector of the data information by using a preset function, with the semantic feature information as a parameter.

Optionally, the step of extracting a semantic feature from the data information includes:
extracting the semantic feature from the data information by using a preset neural network model.

Optionally, the preset neural network model includes: ResNet-152.

Optionally, the step of acquiring a feature vector of the data information by using a preset function, with the semantic feature information as a parameter, includes:

setting a function and variables of the function according to the type of the data information; and acquiring a feature vector of the data information by using the function, with the semantic feature information as a parameter.

Optionally, the function at least includes: a summation function and a hyperbolic tangent function.

Optionally, the data information includes: text information and image information.

Optionally, when the data information is image information, the step of extracting a semantic feature from the data information to acquire semantic feature information includes:

splitting the data information based on a feature of a preset level of the neural network model; and acquiring each piece of the split semantic feature information.

Optionally, when the data information is image information, the preset function includes:

a hyperbolic tangent function with a preset feature matrix, and a summation function.

Optionally, the step of acquiring a feature vector of the data information by using a preset function, with the semantic feature information as a parameter, includes:

acquiring a sum of the semantic feature information according to the summation function;

training the sum of the semantic feature information according to the preset feature matrix, to acquire a training result; and acquiring a feature vector of the data information according to the hyperbolic tangent function, with the training result as a parameter.

Optionally, before the step of acquiring a sum of the semantic feature information according to the summation function, the method includes:

acquiring a weight of each piece of the semantic feature information.

Optionally, the step of acquiring a weight of each piece of the semantic feature information includes:

acquiring an intermediate feature variable of each piece of the semantic feature information;

acquiring a training vector of each piece of the semantic feature information by using a preset exponential function, with a product of the intermediate feature variable of each piece of the semantic feature information and a preset first neural parameter as a parameter;

acquiring a sum of the training vectors according to the summation function; and dividing the training vector of each piece of the semantic feature information by the sum of the training vectors, to acquire the weight of each piece of the semantic feature information.

Optionally, the preset exponential function includes: an exponential function with e as the base.

Optionally, the preset first neural parameter is acquired by learning and training with a backpropagation algorithm.

Optionally, an algorithm for acquiring the weight of each piece of the semantic feature information includes:

$$\alpha_{v,n}^{(k)} = \frac{\exp(w_{v,n}^{(k)} h_{v,n}^{(k)})}{\sum_{n'=1}^{N} \exp(w_{v,n}^{(k)} h_{v,n'}^{(k)})}$$

where the letters v, n represent a specific piece of the semantic feature information, the letter k represents the number of iterations, the letter N represents the total number of pieces of the semantic feature information, n' represents a specific piece of the semantic feature information, the symbol Σ represents the summation function, exp represents the exponential function with e as the base, $w_{v,n}^{(k)}$ represents the preset first neural parameter, $h_{v,n}^{(k)}$ represents the intermediate feature variable, and $\alpha_{v,n}^{(k)}$ represents the weight of each piece of the semantic feature information.

Optionally, the step of acquiring an intermediate feature variable of each piece of the semantic feature information includes:

using a product of each piece of the semantic feature information and a preset second neural parameter as a parameter; and acquiring the intermediate feature variable of each piece of the semantic feature information by using the hyperbolic tangent function.

Optionally, after the step of using a product of each piece of the semantic feature information and a preset second neural parameter as a parameter, the method includes:

normalizing the product of each piece of the semantic feature information and the preset second neural parameter.

Optionally, the step of normalizing includes: a norm L1norm.

Optionally, after the step of acquiring an intermediate feature variable of each piece of the semantic feature information, the method includes:

using a product of a memorized vector and a preset third neural parameter as a parameter; and acquiring a memorized feature variable of the semantic feature information by using the hyperbolic tangent function.

Optionally, after the step of using a product of a memorized vector and a preset third neural parameter as a parameter, the method includes:

normalizing the product of the memorized vector and the preset third neural parameter.

Optionally, the step of normalizing includes: a norm L1norm.

Optionally, after the step of acquiring a memorized feature variable of the semantic feature information, the method includes:

using a product of the intermediate feature variable of the semantic feature information and the memorized feature variable of the corresponding semantic feature information as a new intermediate feature variable of the semantic feature information.

Optionally, the preset second and third neural parameters are acquired by learning and training with a backpropagation algorithm.

Optionally, an algorithm for obtaining the product of the intermediate feature variable of the semantic feature information and the memorized feature variable of the corresponding semantic feature information includes:

$$h_{v,n}^{(k)} = \tan h(L1\mathrm{norm}(w_v^{(k)} V n)) \otimes \tan h(L1\mathrm{norm}(w_{v,n}^{(k)} m_v^{(k-1)}))$$

where the letters v, n represent a specific piece of the semantic feature information, the letter k represents the number of iterations, the symbol L1norm represents a norm, tan h represents the hyperbolic tangent function, $w_v^{(k)}$ represents the preset second neural parameter, $w_{v,m}^{(k)}$ represents the preset third neural parameter, $V_n$ represents the semantic feature information, $m_v^{(k-1)}$ represents the memorized feature variable, and $h_{v,n}^{(k)}$ represents the intermediate feature variable.

Optionally, the step of acquiring a memorized feature variable of the semantic feature information includes:

acquiring a sum of the semantic feature information according to the summation function;

acquiring an average of the sum of the semantic feature information according to the number of pieces of the semantic feature information;

training the average of the sum of the semantic feature information according to the preset feature matrix, to acquire a training result; and acquiring the memorized feature variable of the semantic feature information by using the hyperbolic tangent function, with the training result as a parameter.

Optionally, after the step of acquiring a training result, the method includes:

normalizing the training result.

Optionally, the step of normalizing includes: a norm L1norm.

Optionally, after the step of acquiring a memorized feature variable of the semantic feature information, the method includes:

normalizing the memorized feature variable of the semantic feature information.

Optionally, the step of normalizing includes: a norm L2norm.

Optionally, an algorithm for acquiring the memorized feature variable of the semantic feature information includes:

$$m_v^{(0)} = L2norm\left(\tanh\left(L1norm\left(p^{(0)} \frac{1}{N}\sum_{n=1}^{N} V_n\right)\right)\right)$$

where $V_n$ represents the semantic feature information, the symbol $\Sigma$ represents the summation function, the letter N represents the total number of pieces of the semantic feature information $p^{(0)}$ represents the preset feature matrix, the symbol L1norm represents a norm, tan h represents the hyperbolic tangent function, and the symbol L2norm represents a norm.

Optionally, after the step of acquiring a memorized feature variable of the semantic feature information, the method includes:

updating the memorized feature variable of the semantic feature information according to the number of iterations.

Optionally, the step of updating the memorized feature variable of the semantic feature information according to the number of iterations includes:

acquiring the feature vector of the data information obtained in the previous iteration; and updating the memorized feature variable of the semantic feature information according to the feature vector of the data information obtained in the previous iteration.

Optionally, an algorithm for acquiring the feature vector of the data information $$v^{(k)} = L2norm\left(\tanh\left(L1norm\left(P^{(k)} \sum_{n=1}^{N} \alpha_{v,n}^{(k)} V_n\right)\right)\right)$$

includes:

where $V_n$ represents the semantic feature information, $\alpha_{v,n}^{(k)}$ represents the weight of each piece of the semantic feature information, the symbol $\Sigma$ represents the summation function, $p^{(k)}$ represents the preset feature matrix, the symbol L1norm represents a norm, tan h represents the hyperbolic tangent function, and the symbol L2norm represents a norm.

Optionally, when the data information is image information, and after the step of acquiring data information, the method includes:

compressing the acquired data information to a preset size.

Optionally, when the data information is text information, the step of extracting a semantic feature from the data information to acquire semantic feature information includes:

performing word segmentation on the text information, to acquire a text vector; and using the text vector as the semantic feature information.

Optionally, when the data information is text information, the preset function includes:

a hyperbolic tangent function and a summation function.

Optionally, the step of acquiring a feature vector of the data information by using a preset function, with the semantic feature information as a parameter, includes:

acquiring a sum of the semantic feature information according to the summation function, with the semantic feature information as a parameter; and using the sum of the semantic feature information as the feature vector of the data information.

Optionally, before the step of acquiring a sum of the semantic feature information, the method includes:

acquiring a weight of each piece of the semantic feature information.

Optionally, the step of acquiring a weight of each piece of the semantic feature information includes:

acquiring an intermediate feature variable of each piece of the semantic feature information;

acquiring a training vector of each piece of the semantic feature information by using a preset exponential function, with a product of the intermediate feature variable of each piece of the semantic feature information and a preset fourth neural parameter as a parameter;

acquiring a sum of the training vectors according to the summation function; and dividing the training vector of each piece of the semantic feature information by the sum of the training vectors, to acquire the weight of each piece of the semantic feature information.

Optionally, the preset exponential function includes: an exponential function with e as the base.

Optionally, the preset fourth neural parameter is acquired by learning and training with a backpropagation algorithm.

Optionally, an algorithm for acquiring the weight of each piece of the semantic feature information includes:

$$\alpha_{u,t}^{(k)} = \frac{\exp(w_{u,n}^{(k)} h_{u,n}^{(k)})}{\sum_{t'=1}^{T} \exp(w_{v,nu}^{(k)} h_{u,n'}^{(k)})}$$

where the letters u, n represent a specific piece of the semantic feature information, the letter k represents the number of iterations, the letter T represents the total number of pieces of the semantic feature information, t' represents a specific piece of the semantic feature information, the symbol Σ represents the summation function, exp represents the exponential function with e as the base, $w_{u,n}^{(k)}$ represents the preset fourth neural parameter, $h_{u,n}^{(k)}$ represents the intermediate feature variable, and $\alpha_{u,t}^{(k)}$ represents the weight of each piece of the semantic feature information.

Optionally, the step of acquiring an intermediate feature variable of each piece of the semantic feature information includes:

using a product of each piece of the semantic feature information and a preset fifth neural parameter as a parameter; and acquiring the intermediate feature variable of each piece of the semantic feature information by using the hyperbolic tangent function.

Optionally, after the step of using a product of each piece of the semantic feature information and a preset fifth neural parameter as a parameter, the method includes:

normalizing the product of each piece of the semantic feature information and the preset fifth neural parameter.

Optionally, the step of normalizing includes: a norm L1norm.

Optionally, after the step of acquiring an intermediate feature variable of each piece of the semantic feature information, the method includes:

using a product of a memorized vector and a preset sixth neural parameter as a parameter; and acquiring a memorized feature variable of the semantic feature information by using the hyperbolic tangent function.

Optionally, after the step of using a product of a memorized vector and a preset sixth neural parameter as a parameter, the method includes:

normalizing the product of the memorized vector and the preset sixth neural parameter.

Optionally, the step of normalizing includes: a norm L1norm.

Optionally, after the step of acquiring a memorized feature variable of the semantic feature information, the method includes:

using a product of the intermediate feature variable of the semantic feature information and the memorized feature variable of the corresponding semantic feature information as a new intermediate feature variable of the semantic feature information.

Optionally, the preset fifth and sixth neural parameters are acquired by learning and training with a backpropagation algorithm.

Optionally, an algorithm for obtaining the product of the intermediate feature variable of the semantic feature information and the memorized feature variable of the corresponding semantic feature information includes:

$$h_{u,n}^{(k)} = \tan h(L1norm(w_v^{(k)} U_t)) \otimes \tan h(L1norm(w_{u,m}^{(k)} m_v^{(k-1)}))$$

where the letters u, n represent a specific piece of the semantic feature information, the letter k represents the number of iterations, the symbol L1norm represents a norm, tan h represents the hyperbolic tangent function, $w_u^{(k)}$ represents the preset fifth neural parameter, $w_{u,m}^{(k)}$ represents the preset sixth neural parameter, $U_t$ represents the semantic feature information, $m_u^{(k-1)}$ represents the memorized feature variable, and $h_{u,n}^{(k)}$ represents the intermediate feature variable.

Optionally, the step of acquiring a memorized feature variable of the semantic feature information includes:

acquiring a sum of the memorized feature information according to the summation function, with the semantic feature information as a parameter; and using the sum of the memorized feature information as the memorized feature vector of the data information.

Optionally, after the step of acquiring a sum of the memorized feature information, the method includes:

normalizing the sum of the memorized feature information.

Optionally, the step of normalizing includes: a norm L2norm.

Optionally, an algorithm for acquiring the memorized feature variable of the semantic feature information includes:

$$m_u^{(0)} = L2norm\left(\sum_{t=1}^{T} U_t\right)$$

where $U_t$ represents the semantic feature information, the symbol Σ represents the summation function, the letter T represents the total number of pieces of the semantic feature information, and the symbol L2norm represents a norm.

Optionally, after the step of acquiring a memorized feature variable of the semantic feature information, the method includes:

updating the memorized feature variable of the semantic feature information according to the number of iterations.

Optionally, the step of updating the memorized feature variable of the semantic feature information according to the number of iterations includes:

acquiring the feature vector of the data information obtained in the previous iteration; and updating the memorized feature variable of the semantic feature information according to the feature vector of the data information obtained in the previous iteration.

Optionally, an algorithm for acquiring the feature vector of the data information includes:

$$u^{(k)} = L2norm\left(\sum_{t=1}^{T} \alpha_{u,t}^{(k)} U_t\right)$$

where $U_t$ represents the semantic feature information, $\alpha_{u,t}^{(k)}$ represents the weight of each piece of the semantic feature information, the symbol Σ represents the summation function, and the symbol L2norm represents a norm.

Optionally, after the step of acquiring a feature vector of the data information, the method includes:

acquiring a feature vector of another data information relative to the data information according to the type of the data information. For example, the another data information relative to the data information is data information obtained in the previous iteration corresponding to the data information in the current iteration. For instance, the another data information may be data information in a previous image or a previous frame in a video, the data information may be the data information in a current image or a current frame in the video.

Optionally, after the step of acquiring a feature vector of another data information relative to the data information according to the type of the data information, the method includes:

calculating a similarity between the another data information relative to the data information and the data information based on the feature vector of the another data information relative to the data information.

Optionally, an algorithm for calculating the similarity between the another data information relative to the data information and the data information includes:

$$L = \sum \{\max(0, \mu - S(V^i_{image}, V^j_{text}) + S(V^j_{image}, V^j_{text})) + \max(0, \mu - S(V^i_{image}, V^i_{text}) + S(V^j_{image}, V^j_{text}))\}$$

where L represents the similarity between the another data information relative to the data information and the data information, max represents taking a maximum value, the symbol $\mu$ represents a similarity threshold, the symbol i represents the data information, the symbol j represents the another data information relative to the data information, $V_{image}$ represents a feature vector of image information, and $V_{text}$ represents a feature vector of text information.

Accordingly, the example embodiments of the present disclosure also provide an apparatus for generating a feature vector. The apparatus includes:

a data information acquisition unit configured to acquire data information;

a semantic extraction unit configured to extract a semantic feature from the data information to acquire semantic feature information; and a feature vector acquisition unit configured to acquire a feature vector of the data information by using a preset function, with the semantic feature information as a parameter.

Optionally, the semantic extraction unit is specifically configured to extract a semantic feature from the data information by using a preset neural network model.

Optionally, the semantic extraction unit is specifically configured to extract the semantic feature from the data information by using a ResNet-152 neural network model.

Optionally, the feature vector acquisition unit includes:

a function setting subunit configured to set a function and variables of the function according to the type of the data information; and a feature vector acquisition subunit configured to acquire a feature vector of the data information by using the function, with the semantic feature information as a parameter.

Optionally, the function setting subunit is specifically configured to set a summation function and a hyperbolic tangent function according to the type of the data information.

Optionally, the data information acquisition unit is specifically configured for acquiring text information and image information.

Optionally, the apparatus for generating a feature vector includes:

a sample acquisition unit configured to acquire a feature vector of another data information relative to the data information according to the type of the data information, after the feature vector of the data information is acquired.

Optionally, the apparatus for generating a feature vector includes:

a similarity calculation unit configured to calculate a similarity between the another data information relative to the data information and the data information based on the feature vector of the another data information relative to the data information, after the feature vector of the another data information relative to the data information is acquired.

Furthermore, the example embodiments of the present disclosure also provide an electronic device. The electronic device includes:

one or more processors;

one or more memories configured to store a program for generating a feature vector, the program performing the following operations when read and executed by the processors: acquiring data information; extracting a semantic feature from the data information, to acquire semantic feature information; and acquiring a feature vector of the data information by using a preset function, with the semantic feature information as a parameter.

Furthermore, the example embodiments of the present disclosure also provide a searching method. The searching method includes:

receiving data information from a user;

acquiring a feature vector of the data information;

comparing the feature vector with a feature vector of pre-established data information; and outputting pre-established data information whose feature vector is in a preset threshold range with the feature vector of the data information.

The data information is text information or image information.

Optionally, the step of acquiring a feature vector of the data information includes:

acquiring the feature vector of the data information by applying the method for generating a feature vector.

Optionally, the feature vector of the pre-established data information includes:

a feature vector of image information pre-established by applying the method for generating a feature vector.

Optionally, the step of comparing the feature vector with a feature vector of pre-established data information includes:

calculating a similarity between the feature vector and the feature vector of the pre-established data information.

Optionally, an algorithm for calculating the similarity between the feature vector and the feature vector of the pre-established data information includes:

$$S(V_{image}, V_{text})$$

where $V_{image}$ represents the feature vector of the pre-established data information, and $V_{text}$ represents the feature vector of the input data information.

Optionally, the step of outputting pre-established data information whose feature vector is in a preset threshold range with the feature vector of the data information includes:

outputting the pre-established data information in order of distance to the feature vector.

Accordingly, the example embodiments of the present disclosure also provide a searching apparatus. The searching apparatus includes:

a data information receiving unit configured to receive input data information;

a feature vector acquisition unit configured to acquire a feature vector of the data information;

a comparison unit configured to compare the feature vector with a feature vector of pre-established data information; and a data information outputting unit configured to output pre-established data information whose feature vector is in a preset threshold range with the feature vector of the data information.

The data information receiving unit is specifically configured to receive input text information or image information.

Optionally, the feature vector acquisition unit is configured to acquire the feature vector of the data information by applying the method for generating a feature vector.

Optionally, the comparison unit is configured to compare the feature vector with a feature vector of image information pre-established by applying the method for generating a feature vector.

Optionally, the comparison unit is configured to calculate a similarity between the feature vector and the feature vector of the pre-established data information.

Optionally, the data information outputting unit is configured to output the pre-established data information in order of distance to the feature vector.

Furthermore, the example embodiments of the present disclosure also provide an electronic device. The electronic device includes:

one or more processors;

one or more memories configured to store a program for outputting data information, the program performing the following operations when read and executed by the processors: receiving data information from a user; acquiring a feature vector of the data information; comparing the feature vector with a feature vector of pre-established data information; and outputting the pre-established data information whose feature vector is in a preset threshold range with the feature vector of the data information.

Compared with the conventional techniques, the present disclosure has the following advantages:

The present disclosure provides a method, an apparatus and an electronic device for generating a feature vector, as well as a searching method, apparatus and electronic device. The method for generating a feature vector includes: acquiring data information; extracting a semantic feature from the data information, to acquire semantic feature information; and acquiring a feature vector of the data information by using a preset function, with the semantic feature information as a parameter. The technical solution identifies picture information by recognizing semantics of image information and matching the semantics of the image information with natural language descriptions. Different from conventional image search schemes of existing search engines, this technical solution does not need retrieve a text description of image information, but retrieves and identifies images based on the content of the image information. Therefore, results with higher accuracy may be returned compared with the existing text-based image search.

BRIEF DESCRIPTION OF THE DRAWINGS

In order to illustrate the technical solutions in the example embodiments of the present disclosure clearly, drawings for description of the example embodiments are briefly outlined below. Obviously, the drawings in the following description only depict some of the example embodiments in the present disclosure, and a person skilled in the art may obtain other figures based on the drawings.

FIGS. 1A through 1F are flowcharts of a method for generating a feature vector according to an example embodiment of the present disclosure;

DETAILED DESCRIPTION

Figure 1A:
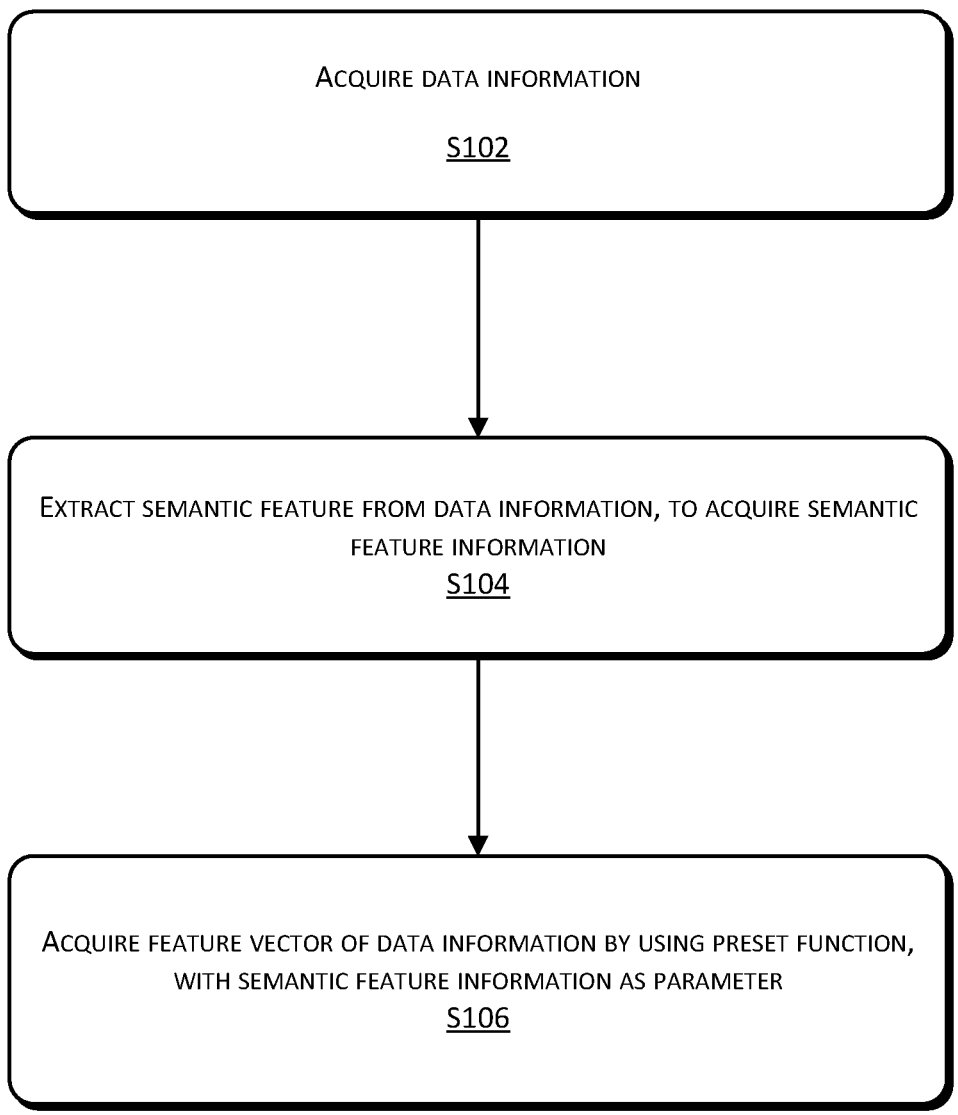

For better understanding of the objectives, features, and advantages of the present disclosure stated above, the present disclosure is further described in detail in conjunction with the accompanying drawings and specific example embodiments. It should be noted that the example embodiments and features in the example embodiments in the present disclosure may be combined with each other as long as they do not conflict with each other.

In the description below, many specific details are illustrated so that the present disclosure may be understood comprehensively. However, the present disclosure may also be implemented in many other ways than those described here, and may be developed by a person skilled in the art without departing from the spirit of the present disclosure. Therefore, the present disclosure is not limited to the specific example embodiments disclosed below.

The example embodiments of the present disclosure provide a method for generating a feature vector; and the example embodiments of the present disclosure also relate to an apparatus for generating a feature vector and an associated electronic device. These will be described one by one in the example embodiments below.

In the existing text-based image search, corresponding natural language descriptions (which may be obtained by extracting the context of an image, the title of a doc file, etc.) are established for all images in a database of a search engine. When a user inputs a search term, similarity degrees between the search term and the natural language descriptions corresponding to the images are calculated and used as similarity degrees between the search term and the related images, so that the images are identified and sorted according to the similarity degrees. It may be seen that, in a text-based image search, images corresponding to a search term are found by matching the search term with text descriptions such as titles and attributes of the images. Therefore, only image data provided with a corresponding text description (of the image) may be retrieved. In addition, as an intermediate in a text-based image search, text descriptions corresponding to images may only reveal partial or one-sided information of the images. Therefore, the images found are inaccurate as the returned results are predominantly affected by the accuracy and completeness of the text descriptions of the images. In view of this problem, in the example embodiments of the present disclosure, picture information may be identified by recognizing semantics of image information and matching the semantics of the image information with natural language descriptions. Different from conventional image search schemes of existing search engines, this technical solution does not need to retrieve a text description of image information, but retrieves and identifies images based on the content of the image information. Therefore, results with higher accuracy may be returned compared with the existing text-based image search.

Before the detailed description of particular steps of this example embodiment, a neural network model involved in the technical solution is briefly introduced first.

A neural network model is a mathematic approach for simulating an actual human neural network. The neural network has a broad and promising prospect in the fields of system identification, mode recognition, intelligent control, etc. Especially, in the field of intelligent control, people are particularly interested in the self-learning function of the neural network and regard it as a key to solving the adaptability issue of the controller in automatic control.

A Neural Network (NN) is a complicated network system formed by a large number of simple processing units (referred to as neurons) interconnected extensively with each other. It resembles many basic features of human brain functions and is a highly complex non-linear dynamic learning system. The neural network is capable of massive parallel and distributed storage and processing, self-organization, self-adaption, and self-learning, and is particularly suitable for handling imprecise and fuzzy information while taking various factors and conditions into consideration. The development of neural networks, as a new interdisciplinary science, is related to the progress in neurology, mathematic science, cognitive science, computer science, artificial intelligence, information science, cybernetics, robotics, microelectronics, psychology, optical computing, molecular biology, and so on.

An example embodiment of the present disclosure provides a method for generating a feature vector. The example embodiment of the method for generating a feature vector is described as follows:

Referring to FIGS. 1A through 1F, a flowchart of a method for generating a feature vector according to an example embodiment of the present disclosure is shown.

The method for generating a feature vector includes the following steps:

S102: Data information is acquired.

In this example embodiment, the step of acquiring data information may be implemented in the following manner: acquiring data information input or uploaded by a user.

It should be understood that the data information may be text information or image information. Therefore, in this step, text information input by a user or image information uploaded by a user may be acquired.

It should be noted that if the data information is image information, the size of the image information may be compressed after the image information uploaded by the user is acquired, because the image information uploaded by the user may have different sizes.

For example, the acquired image information may be compressed to an image size of 224×224.

S104: A semantic feature is extracted from the data information, to acquire semantic feature information.

In this example embodiment, the step of extracting a semantic feature from the data information to acquire semantic feature information may be implemented in the following manner: extracting a semantic feature from the data information by using an extraction method corresponding to the type of the data information, to acquire semantic feature information.

In a specific implementation as FIG. 1B illustrates, the semantic feature may be extracted from the data information by using a preset neural network model at a substep S1042 of S104. The preset neural network model may be ResNet-152.

The process of extracting the semantic feature is described below based on different types of the data information.

Figure 1C:
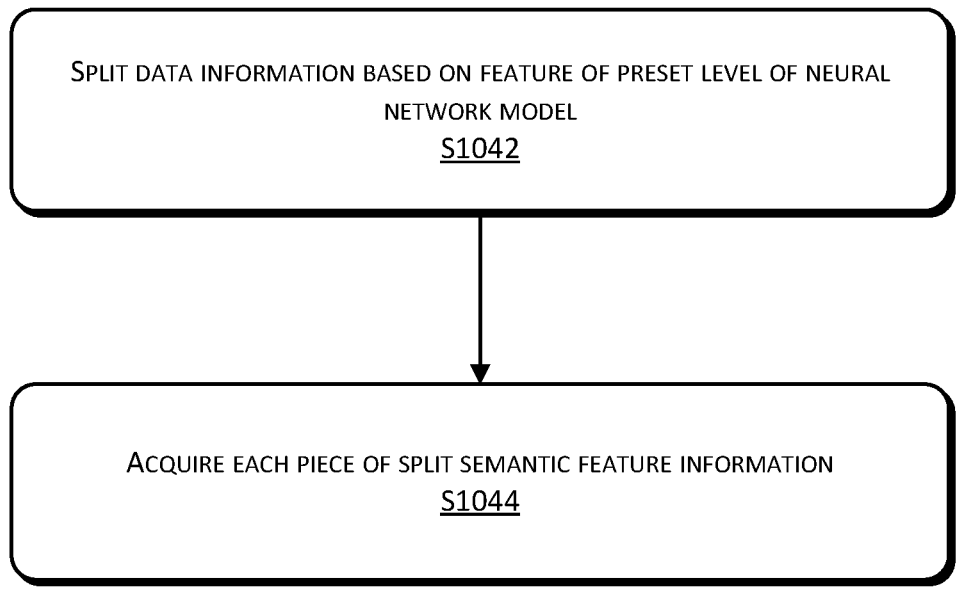

When the type of the data information is image (i.e. the data information is image information), the step of extracting a semantic feature from the data information to acquire semantic feature information specifically includes, as FIG. 1C illustrates, steps of:

splitting the data information based on a feature of a preset level of the neural network model at a substep S1042 of S104; and acquiring each piece of the split semantic feature information at a substep S1044 of S104.

acquiring each piece of the split semantic feature information.

In particular, the preset level in the neural network model is level res5c, which has a size of 7*7. Therefore, when the semantic feature is extracted from the data information at the res5c level, the image will be split according to the size of the res5c level. An image having a size of 224×224 will be split into 49 feature points (where each feature point corresponds to a 32×32 area in the original image), and has 2048 dimensions. Each of the split blocks is semantic feature information of the data information. All the pieces of semantic feature information are denoted as a set $(V_n)_{n=1}^N$, where N=49.

When the type of the data information is text (i.e. the data information is text information), the step of extracting a semantic feature from the data information to acquire semantic feature information specifically includes steps of:

performing word segmentation on the text information, to acquire a text vector; and using the text vector as the semantic feature information.

In particular, the step of performing word segmentation on the text information means obtaining a sequence of segmented words by using a word segmentation algorithm and converting each word or character in the sequence into a vector based on one-hot code according to a dictionary. For example, if the text information input by a user is "vintage ribbon shirt", the text vector {vintage, ribbon, shirt} is acquired after the data information is segmented into words.

It should be noted that one-hot code vectors would be sparse long vectors. In order to facilitate processing, the one-hot code may be converted into dense vectors with lower dimensions by using Embedding Layer, and the resultant vector sequence may be used as the input to a text network. Each word or character acquired based on the word segmentation algorithm is a piece of semantic feature information of the data information, and all pieces of semantic feature information are collectively denoted as a set $(U_t)_{t=1}^T$.

S106: A feature vector of the data information is acquired by using a preset function, with the semantic feature information as a parameter.

Figure 1D:
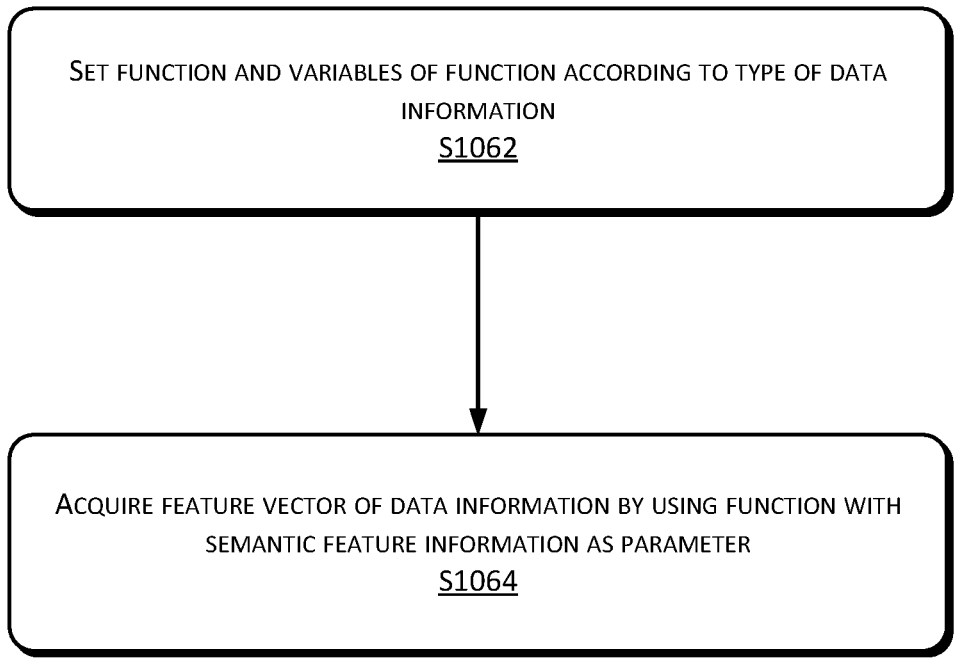

In this example embodiment, the step of acquiring a feature vector of the data information by using a preset function, with the semantic feature information as a parameter, may be implemented in the following manner as FIG. 1D illustrates: setting a function and variables of the function according to the type of the data information at a substep S1062 of S106; and acquiring the feature vector of the data information by using the function with the semantic feature information as the parameter at a substep S1064 of S106. An example includes substituting the semantic feature information as a parameter into the preset function, calculating with the semantic feature information as an independent variable of the function, and using the result output by the function as the feature vector of the data information.

The preset function means a function and variables of the function configured according to the type of the data information. For example, the preset function may be a summation function and a hyperbolic tangent function.

It should be noted that the symbol for the summation function is capitalized Σ, and its function is to add up all the values from the lower limit to the upper limit. The symbol for the hyperbolic tangent function is tan h( ), and in mathematics, the function "tan h" is derived from basic hyperbolic functions, i.e., hyperbolic sine and hyperbolic cosine.

The process of acquiring a feature vector of the data information in this step is described below based on different types of the data information.

When the type of the data information is image (i.e. the data information is image information), the preset function includes: a hyperbolic tangent function with a preset feature matrix, and a summation function.

The preset feature matrix is a matrix with variable feature outputs, and it may be obtained by learning and training with a backpropagation algorithm.

It should be noted that the backpropagation algorithm is currently the most common and most effective algorithm for training an Artificial Neural Network (ANN). The algorithm employs the following main principle: (1) A training set of data is input to the input layer of the ANN, passes through the hidden layer, and finally reaches the output layer to output a result. This is the process of forward propagation of the ANN. (2) The output result from the ANN deviates from an actual result, and therefore a difference between the estimated value and the actual value is calculated and propagated reversely from the output layer through the hidden layer to the input layer. (3) In the process of backpropagation, values of parameters are adjusted according to the difference. The above process is iterated until convergence.

Figure 1E:
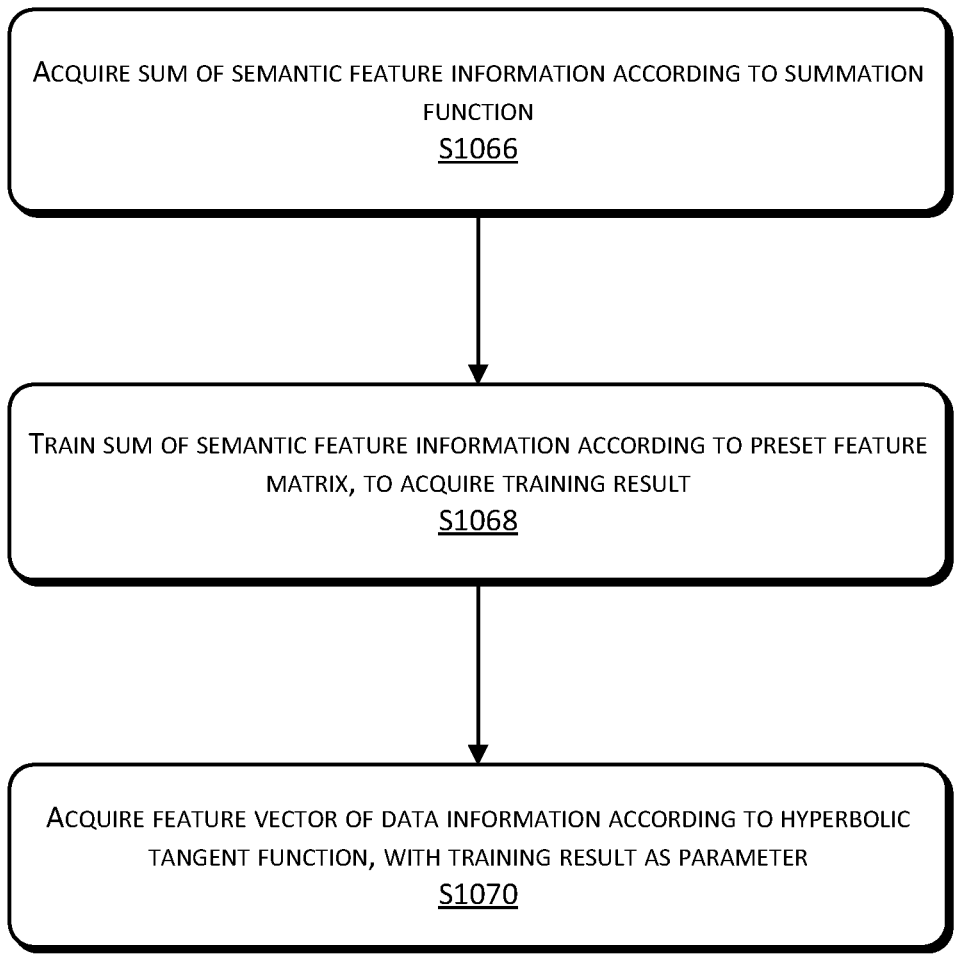
Figure 1F:
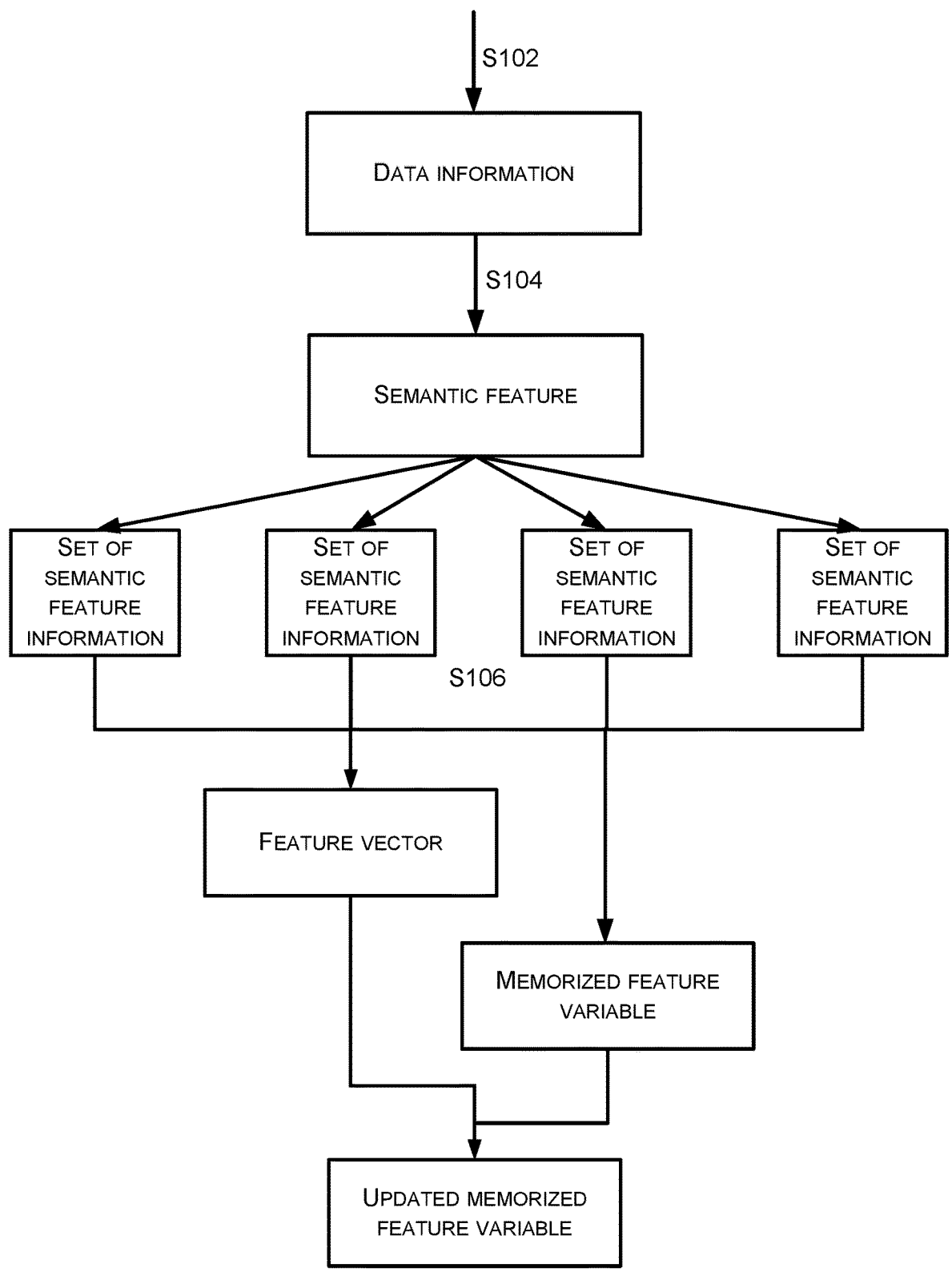

In particular, when the data information is image information, step S106 of acquiring a feature vector of the data information by using a preset function, with the semantic feature information as a parameter, specifically includes, as FIG. 1E illustrates, steps of:

acquiring a sum of the semantic feature information according to the summation function at a substep S1066 of S106;

training the sum of the semantic feature information according to the preset feature matrix, to acquire a training result, at a substep S1068 of S106; and acquiring the feature vector of the data information according to the hyperbolic tangent function, with the training result as a parameter, at a substep S1070 of S106.

The preset feature matrix is a matrix with 256×2048 dimensions. For example, the preset feature matrix is as follows (the preset feature matrix is only part of the actual feature matrix and is merely illustrative):

0.6452 0.0019 −2.5452 −0.8552 −0.4027 . . . −0.2623 1.5792 −0.9256

−2.2919 −1.0778 −3.4238 −0.5027 −0.8968 . . . −0.4267 −0.6993 0.8372

. . .
. . .

−4.1119 −0.3861 2.6092 1.8701 −0.4891 . . . 0.2486 −0.1042 0.5646

−5.6075 −0.5197 0.2059 −1.6120 0.4358 . . . 0.0125 0.7711 0.3752

In this example embodiment, as there are 49 pieces of the semantic feature information in the set of semantic feature information, the sum of the 49 pieces of the semantic feature information is obtained based on the function Σ. Then the sum of the semantic feature information is multiplied by the preset feature matrix to obtain a calculated training result. Calculation is performed with the training result as an independent variable of the hyperbolic tangent function, and the result output by the hyperbolic tangent function is used as the feature vector of the data information.

In this example embodiment, the core content of an image is the most important part of the image, while other background content is less important. Since the 49 pieces of the semantic feature information in the set of semantic feature information are obtained by splitting the original image information, the content in some of the semantic feature information is less important. Therefore, in order to emphasize the generated feature vector of the image information, an example implementation is proposed in the present disclosure. In this example implementation, before the step of acquiring a sum of the semantic feature information according to the summation function, the method includes: acquiring a weight of each piece of the semantic feature information.

In this example embodiment, the step of acquiring a weight of each piece of the semantic feature information includes steps of:

acquiring an intermediate feature variable of each piece of the semantic feature information;

acquiring a training vector of each piece of the semantic feature information by using a preset exponential function, with a product of the intermediate feature variable of each piece of the semantic feature information and a preset first neural parameter as a parameter;

acquiring a sum of the training vectors according to the summation function; and dividing the training vector of each piece of the semantic feature information by the sum of the training vectors, to acquire the weight of each piece of the semantic feature information.

It should be noted that the intermediate feature variable of each piece of the semantic feature information is obtained by training each piece of the semantic feature information according to neural parameters of the neural network model until convergence. The preset exponential function is an exponential function exp with e as the base. The preset first neural parameter may be acquired by learning and training with a backpropagation algorithm.

For example: The preset first neural parameter $\in R^{1 \times 256}$ is as follows (the preset first neural parameter is only part of the actual neural parameters and is merely illustrative):

[−7.24247, 57.93429, −3385665, . . . , 7.91416, 57, 26443, −61.90066, 13.81045]

In this example embodiment, calculation is performed by using the product of the acquired intermediate feature variable of each piece of the semantic feature information and the preset first neural parameter as an independent variable of the exponential function, and the result output by the exponential function exp is used as the training vector of each piece of the semantic feature information. Calculation is performed by using the sum of the training vectors as an independent variable of the summation function, and the result output by the summation function is used as the sum of the training vectors. The training vector of each piece of the semantic feature information in the foregoing step is divided by the sum of the training vectors of all the semantic feature information, to acquire the weight of each piece of the semantic feature information in the set of semantic feature information.

It should be noted that the intermediate feature variable of each piece of the semantic feature information by training each piece of the semantic feature information according to neural parameters of the neural network model until convergence. The training process includes steps of:

using a product of each piece of the semantic feature information and a preset second neural parameter as a parameter; and acquiring the intermediate feature variable of each piece of the semantic feature information by using the hyperbolic tangent function.

It should be noted that the preset second neural parameter may be acquired by learning and training with a backpropagation algorithm. The preset second neural parameter is a matrix with $R^{256 \times 2048}$. For example, the preset second neural parameter is as follows (the preset second neural parameter is only part of the actual neural parameters and is merely illustrative):

−1.2500 −0.3455 −0.5030 0.0839 0.0438 . . . 0.0148 0.2202 0.3315

−5.1709 0.3299 4.9599 −1.8082 0.3846 . . . 0.4864 −0.8376 0.4584

. . .

. . .

−0.7621 −0.4154 −1.0320 −0.1450 0.2305 . . . 0.0253 −0.1080 0.0293

−0.5779 −0.0224 0.0077 −0.3267 −0.4468 . . . 0.0280 −0.2103 0.0051

In this example embodiment, calculation is performed by using the product of each piece of the semantic feature information and the preset second neural parameter as an independent variable of the hyperbolic tangent function tan h, and the result output by the hyperbolic tangent function tan h is used as the intermediate feature variable of each piece of the semantic feature information.

The use of the hyperbolic tangent function tan h may cause the problem of vanishing gradient in the neural network. In order to eliminate such a phenomenon, an example implementation is proposed in the present disclosure. In this example implementation, after the step of using a product of each piece of the semantic feature information and a preset second neural parameter as a parameter, the product is normalized.

It should be noted that the normalization in this step uses a norm L1norm, to limit the product in the value range of [−1, 1]. In this value range, the inverse of the tan h function is around the maximum value, thus eliminating the phenomenon of vanishing gradient.

L1norm (sum of absolute values): $\|x\|p = (|x1|^p + |x2|^p + \ldots + |xn|^p)^{\{1/p\}}$ As an example implementation, in the method for generating a feature vector provided by the example embodiment of the present disclosure, a description of the whole image is used as an input in the process of acquiring the feature vector of the data information, in order to output the feature vector. To better emphasize the generated feature vector of the image information, the main part of the image should be more prominent from the whole image. Therefore, it is necessary to perform multiple iterations and introduce a memorized vector during the process of acquiring the feature vector. Therefore, after the step of acquiring an intermediate feature variable of each piece of the semantic feature information, the method includes steps of:

using a product of a memorized vector and a preset third neural parameter as a parameter; and acquiring a memorized feature variable of the semantic feature information by using the hyperbolic tangent function.

It should be noted that the preset third neural parameter may be acquired by learning and training with a backpropagation algorithm. The preset third neural parameter is a matrix with $R^{256 \times 2048}$. For example, the preset third neural parameter is as follows (the preset third neural parameter is only part of the actual neural parameters and is merely illustrative):

−0.0052 0.0988 0.0907 0.0220 −0.1422 . . . 0.0298 0.0349 −0.0271

−0.9448 0.6860 1.5810 0.5036 3.0784 . . . 0.7467 0.1264 −0.5278

. . .

. . .

−0.3272 −0.1266 0.0013 0.1080 −0.0179 . . . −0.1667 0.1726 0.1332

−0.3542 −0.1227 −0.0538 −0.0345 −0.1198 . . . −0.0575 0.0194 0.1203

In this example embodiment, calculation is performed by using the product of the memorized vector and the preset third neural parameter as an independent variable of the hyperbolic tangent function tan h, and the result output by the hyperbolic tangent function tan h is used as the memorized feature variable of the semantic feature information.

Likewise, since the use of the hyperbolic tangent function tan h may cause the problem of vanishing gradient in the neural network, after the step of using a product of the memorized vector and a preset third neural parameter as a parameter, the product is normalized with a norm L1norm.

As an example implementation, after the introduction of the memorized vector in the method for generating a feature vector provided by the example embodiment of the present disclosure, it is further necessary to introduce the memorized feature variable of the semantic feature information acquired based on the memorized vector into the intermediate feature variable of each piece of the semantic feature information, to emphasize the main part of the image information. Specifically, after the step of acquiring a memorized feature variable of the semantic feature information, the method further includes a step of using a product of the intermediate feature variable of the semantic feature information and the memorized feature variable of the corresponding semantic feature information as a new intermediate feature variable of the semantic feature information.

In this example embodiment, the memorized feature variable of the semantic feature information may be acquired in the following manner:

acquiring a sum of the semantic feature information according to the summation function;

acquiring an average of the sum of the semantic feature information according to the number of pieces of the semantic feature information;

training the average of the sum of the semantic feature information according to the preset feature matrix, to acquire a training result; and acquiring the memorized feature variable of the semantic feature information by using the hyperbolic tangent function, with the training result as a parameter.

It should be noted that the preset feature matrix is a matrix with 256×2048 dimensions. For example, the preset feature matrix is as follows (the preset feature matrix is only part of the actual feature matrix and is merely illustrative):

1.6140 −0.2567 0.0608 0.4921 1.5323 . . . −0.3697 −0.7022 0.4785

−0.3732 −0.5847 1.4954 −0.0923 0.8537 . . . −0.8349 −0.6067 0.7837

. . .

. . .

−6.1630 0.2794 2.0357 −0.2870 −0.0096 . . . 0.1213 −0.5392 0.0923

−2.0438 −0.0973 −0.8201 −0.7411 −1.1014 . . . 0.2781 −0.4832 0.0930

In this example embodiment, as there are 49 pieces of the semantic feature information in the set of semantic feature information, the sum of the 49 pieces of the semantic feature information is obtained based on the summation function Σ. The sum of the semantic feature information is divided by 49 to obtain an average of the sum of the semantic feature information. Then the average of the sum of the semantic feature information is multiplied by the preset feature matrix to obtain a calculated training result. Calculation is performed by using the training result as an independent variable of hyperbolic tangent function, and the result output by the hyperbolic tangent function is used as the memorized feature variable of the data information.

Likewise, since the use of the hyperbolic tangent function tan h may cause the problem of vanishing gradient in the neural network, after the step of acquiring a training result, the training result should be normalized with a norm L1norm.

In order to prevent the acquired memorized feature variable model of the semantic feature information from overfitting, an example implementation is proposed in the present disclosure. In the example implementation, after the step of acquiring a memorized feature variable of the semantic feature information, the memorized feature variable of the semantic feature information is again normalized.

It should be noted that the normalization in this step uses a norm L2norm. L2norm is adopted for normalization. L2norm refers to an Euclidean distance, which denotes a true distance between two points in an m-dimensional space.

As an example implementation, in the method for generating a feature vector provided by the example embodiment of the present disclosure, in order to emphasize the main part of the image information, a second iteration should be performed on the data information after the semantic feature information of the data information is acquired through the first iteration. The method for generating a feature vector is performed again to repeat the above process.

During the second iteration, the memorized feature variable of the semantic feature information may be updated according to the number of iterations that have been performed. For example, the memorized feature variable of the semantic feature information is updated based on the feature vector of the semantic feature information acquired in the first iteration, and the updated memorized feature variable of the semantic feature information is substituted as a new parameter for repeating the steps in a second iteration. This specifically includes steps of:

acquiring the feature vector of the data information obtained in the previous iteration; and updating the memorized feature variable of the semantic feature information according to the feature vector of the data information obtained in the previous iteration.

An algorithm for updating the memorized feature variable of the semantic feature information is as follows:

$$m_v^{(k)} = m_v^{(k-1)} \| v^{(k)}$$

where Vtest=$u^{(0)} \| u^{(1)}$ represents a feature concatenating operation, $m_v^{(k-1)}$ represents the memorized feature variable of the semantic feature information in the second iteration, and $v^{(k)}$ represents the feature vector of the data information obtained in the previous iteration.

Referring to Table 1, feature vectors of the data information that are acquired based on the above method in the actual operation are listed in the table. It may be seen from the data in Table 1 that the first iteration focuses on the category, design, type, etc., while the second iteration concentrates on the texture, style, details, and the like of the object, so that the main part of the image information is emphasized.

TABLE 1

| Original text | Feature vector in first iteration | Feature vector in second iteration |
|---|---|---|
| vintage | vintage: 0.06105 | vintage: 0.40106 |
| ribbon shirt | ribbon: 0.12003 | ribbon: 0.47739 |
|  | shirt: 0.81891 | shirt: 0.12154 |
| jacket | jacket: 0.761409 | jacket: 0.1179206222 |
| reversible | reversible: 0.1396 | reversible: 0.18028059 |
| embroidered | embroidered: 0.0522 | embroidered: 0.3968906104 |
| female | female: 0.04678 | female: 0.304908156395 |
| large loose | large: 0.0526 | large: 0.17300 |
| autumn chiffon | loose: 0.08108 | loose: 0.11496 |
| one-piece | autumn: 0.0592 | autumn: 0.118022888899 |
|  | chiffon: 0.17736 | chiffon: 0.5135599982 |
|  | one-piece: 0.6297 | one-piece: 0.08044 |

The process of acquiring the feature vector of the data information is described below by a particular example where the type of the data information is image.

After the extraction of feature information from the image information, the resultant set of semantic feature information $\{V_n\}_{n=1}^{N}$, N=49 is as follows (the set of semantic feature information is only part of the actual set of semantic feature information and is merely illustrative):

| 0 | 0 | 0 | 0 | 0 | . . . 0 | 0 | 0 | 0 | 0 |
|---|---|---|---|---|---|---|---|---|---|
| 0 | 0 | 0 | 0 | 0 | . . . 0 | 0 | 0 | 0 | 0 |
| 0 | 0 | 0 | 0 | 0 | . . . 0 | 0 | 0 | 0 | 0 |
| 1.7554 | 0 | 0 | 0 | 0 | . . . 0 | 0 | 1.5335 | 0 | 0 |
| 0 | 0 | 0 | 0 | 0 | . . . 0 | 0 | 0 | 0 | 0 |
| 0 | 1.0834 | 0 | 0.8986 | 0 | . . . 0 | 0 | 0 | 0 | 0 |
| . . . | | | | | | | | | |
| . . . | | | | | | | | | |
| 0 | 0 | 0 | 0 | 0 | . . . 0 | 0 | 0 | 0 | 0 |
| 0 | 0 | 0 | 0 | 0 | . . . 25119 | 0 | 0.1177 | 0 | 0 | where $V_n$ is a vector of the $n^{th}$ column. There are a total of 49 columns, with 2048 dimensions in each column. Since a ReLU activation layer is added to the res5c layer of ResNet-152, many elements in the vector are 0.

After being acquired, the semantic feature information is substituted into the algorithm for the memorized feature variable of the semantic feature information, to initialize the memorized feature variable.

The algorithm for acquiring the memorized feature variable of the semantic feature information includes:

$$m_v^{(0)} = L2norm\left(\tanh\left(L1norm\left(p^{(0)} \frac{1}{N}\sum_{n=1}^{N} V_n\right)\right)\right)$$

where $V_n$ represents the semantic feature information, the symbol represents the summation function, the letter N (which equals to 49 in this case) represents the total number of pieces of the semantic feature information, $p^{(0)}$ represents the preset feature matrix, the symbol L1norm represents a norm, tan h represents the hyperbolic tangent function, and the symbol L2norm represents a norm.

It should be noted that the preset feature matrix $p^{(0)}$ is a matrix with 256×2048 dimensions. For example, the preset feature matrix is as follows (the preset feature matrix is only part of the actual feature matrix and is merely illustrative):

1.6140 −0.2567 0.0608 0.4921 1.5323 . . . −0.3697 −0.7022 0.4785

−0.3732 −0.5847 1.4954 −0.0923 0.8537 . . . −0.8349 −0.6067 0.7837

. . .

. . .

−6.1630 0.2794 2.0357 −0.2870 −0.0096 . . . 0.1213 −0.5392 0.0923

−2.0438 −0.0973 −0.8201 −0.7411 −1.1014 . . . 0.2781 −0.4832 0.0930

For $\{V_n\}_{n=1}^{49}$, a sum of the semantic feature information is calculated based on the summation function. The sum of the semantic feature information is divided by 49 (1/N) and then is subject to calculation with the preset feature matrix $p^{(0)}$, to finally obtain $m_v^{(0)}$. The memorized feature variable of the semantic feature information is as follows:

[−0.00041, −0.01409, 0.03567, . . . 0.0268, 1.11703, 0.01581, −0.04466]

After being acquired, the memorized feature variable of the semantic feature information is substituted into the algorithm for acquiring an intermediate feature variable, to obtain the intermediate feature variable.

The algorithm for acquiring the intermediate feature variable includes:

$$h_{v,n}^{(k)} = \tan h(L1norm(w_v^{(k)}V_n)) \otimes \tan h(L1norm(w_{v,m}^{(k)} m_v^{(k-1)}))$$

where the letters v, n represent a specific piece of the semantic feature information, the letter k (k=1 in this case) represents the number of iterations, the symbol L1norm represents a norm, tan h represents the hyperbolic tangent function, $w_v^{(k)}$ represents the preset second neural parameter, $w_{v,m}^{(k)}$ represents the preset third neural parameter, $V_n$ represents the semantic feature information, $w_v^{(k-1)}$ represents the memorized feature variable, and $h_{v,n}^{(k)}$ represents the intermediate feature variable.

It should be noted that the preset second neural parameter may be acquired by learning and training with a backpropagation algorithm. The preset second neural parameter is a matrix with $R^{256 \times 2048}$. For example, the preset second neural parameter is as follows (the preset second neural parameter is only part of the actual neural parameters and is merely illustrative):

−1.2500 −0.3455 −0.5030 0.0839 0.0438 . . . 0.0148 0.2202 0.3315

−5.1709 0.3299 4.9599 −1.8082 0.3846 . . . 0.4864 −0.8376 0.4584

. . .

. . .

−0.7621 −0.4154 −1.0320 −0.1450 0.2305 . . . 0.0253 −0.1080 0.0293

−0.5779 −0.0224 0.0077 −0.3267 −0.4468 . . . 0.0280 −0.2103 0.0051

The preset third neural parameter may be acquired by learning and training with a backpropagation algorithm. The preset third neural parameter is a matrix with $R^{256 \times 2048}$. For example, the preset third neural parameter is as follows (the preset third neural parameter is only part of the actual neural parameters and is merely illustrative):

−0.0052 0.0988 0.0907 0.0220 −0.1422 . . . 0.0298 0.0349 −0.0271

−0.9448 0.6860 1.5810 0.5036 3.0784 . . . 0.7467 0.1264 −0.5278

. . .

. . .

−0.3272 −0.1266 0.0013 0.1080 −0.0179 . . . −0.1667 0.1726 0.1332

−0.3542 −0.1227 −0.0538 −0.0345 −0.1198 . . . −0.0575 0.0194 0.1203

The finally obtained $h_{v,n}^{(k)}$, i.e. the intermediate feature variable of the semantic feature information, is as follows:

−1.36e-06 −1.19e-03 −1.12e-05 5.70e-06 . . . −1.25e-06 −3.49e-05 −1.57e-06

−1.67e-06 −3.37e-04 −6.54e-06 2.07e-06 . . . 4.29e-04 −3.32e-06 −1.00e-06

. . .

. . .

9.64e-07 3.35e-04 −5.46e-06 −1.41e-06 . . . −6.51e-04 −2.66e-04 −2.35e-06

−6.56e-06 3.65e-04 −4.55e-06 −4.79e-06 . . . −7.59e-04 1.89e-05 3.31e-06

After being acquired, the intermediate feature variable of the semantic feature information is substituted into the algorithm for acquiring a weight of each piece of the semantic feature information, to obtain the weight.

The algorithm for acquiring the weight of each piece of the semantic feature information includes:

$$\alpha_{v,n}^{(k)} = \frac{\exp(w_{v,n}^{(k)} h_{v,n}^{(k)})}{\sum_{n'=1}^{N} \exp(w_{v,n}^{(k)} h_{v,n'}^{(k)})}$$

where the letters v, n represent a specific piece of the semantic feature information, the letter k (k=1) represents the number of iterations, the letter N (N=49) represents the total number of pieces of the semantic feature information, n' represents a specific piece of the semantic feature information, the symbol Σ represents the summation function, exp represents the exponential function with e as the base, $w_{v,n}^{(k)}$ represents the preset first neural parameter, $h_{v,n}^{(k)}$ represents the intermediate feature variable, and $\alpha_{v,n}^{(k)}$ represents the weight of each piece of the semantic feature information.

It should be noted that the preset first neural parameter is as follows (the preset first neural parameter is only part of the actual neural parameters and is merely illustrative):

[−7.24247, 57.93429, −3385665, . . . , 7.91416, 57, 26443, −61.90066, 13.81045]

The finally obtained weight $\alpha_{v,n}^{(k)}$ of each piece of the semantic feature information is as follows:

[0.0114, 0.0125, 0.0151, 0.0106, 0.0143, 0.0137, 0.0132, 0.0271, 0.019, 0.0281, 0.0209, 0.0159, 0.0279, 0.0179, 0.0407, 0.0187, 0.017, 0.0196, 0.0183, 0.0154, 0.016, 0.0178, 0.0246, 0.0249, 0.0229, 0.0263 . . . , 0.0207]

It should be noted that, since $\alpha_{v,n}^{(k)}$ represents the weight of each piece of the semantic feature information, $\alpha_{v,n}^{(k)}$ has 49 (which is equal to the value of N) values.

After being acquired, the weight of each piece of the semantic feature information is substituted into the algorithm for acquiring a feature vector of the data information, to obtain the feature vector of the data information.

The algorithm for the feature vector of the data information includes:

$$v^{(k)} = L2norm\left(\tanh\left(L1norm\left(P^{(k)}\sum_{n=1}^{N}\alpha_{v,n}^{(k)}V_n\right)\right)\right)$$

where $V_n$ in represents the semantic feature information, $\alpha_{v,n}^{(k)}$ represents the weight of each piece of the semantic feature information, the symbol $\Sigma$ represents the summation function, $p^{(k-1)}$ represents the preset feature matrix, the symbol L1norm represents a norm, tan h represents the hyperbolic tangent function, and the symbol L2norm represents a norm.

It should be noted that the preset feature matrix is a matrix with 256×2048 dimensions. For example, the preset feature matrix is as follows (the preset feature matrix is only part of the actual feature matrix and is merely illustrative):

0.6452 0.0019 −2.5452 −0.8552 −0.4027 . . . −0.2623 1.5792 −0.9256

−2.2919 −1.0778 −3.4238 −0.5027 −0.8968 . . . −0.4267 −0.6993 0.8372

. . .

. . .

−4.1119 −0.3861 2.6092 1.8701 −0.4891 . . . 0.2486 −0.1042 0.5646

−5.6075 −0.5197 0.2059 −1.6120 0.4358 . . . 0.0125 0.7711 0.3752

The finally obtained $v^{(k=1)}$, i.e. the feature vector of the semantic feature information, is as follows:

[0.04600, −0.00148, 0.08116, . . . −0.0255, 0.04194, −0.10204, −0.06923]

After the first iteration with k=1, the obtained feature vector $v^{(k=1)}$ is substituted into the algorithm for a memorized feature variable of the semantic feature information, to carry out a second iteration.

As the computing process with k=2 is substantially the same as the process with k=1, this computing process is not described again.

It should be noted that the final feature vector of the data information may be obtained after the second iteration. The number of interactions being two in this process is empirical data resulting from a large number of texts by those skilled in the art. The acquired feature vector is optimal when k=2.

The process of acquiring a feature vector of the data information in this step is described below based on different types of the data information.

When the type of the data information is text (i.e. the data information is text information), the preset function includes: a hyperbolic tangent function and a summation function.

In particular, when the data information is text information, step S106 of acquiring a feature vector of the data information by using a preset function, with the semantic feature information as a parameter, specifically includes steps of:

acquiring a sum of the semantic feature information according to the summation function, with the semantic feature information as a parameter; and using the sum of the semantic feature information as the feature vector of the data information.

For example, if the semantic feature information is "red" and "one-piece" extracted after word segmentation, there are 2 groups of data in the set of semantic feature information formed. A sum is calculated with the above 2 groups of data as independent variables of the summation function. The sum is used as the feature vector of the data information.

In this example embodiment, some of the extracted segmented words are the core content (e.g. type, clothes, trousers, etc.), while other words modify the core content (e.g. color, and size). Since the semantic feature information in the set of semantic feature information is obtained by splitting the original text information, the content in some of the semantic feature information is less important. In order to emphasize the generated feature vector of the text information, an example implementation is proposed in the present disclosure. In this example implementation, before the step of acquiring a sum of the semantic feature information according to the summation function, the method includes: acquiring a weight of each piece of the semantic feature information.

In this example embodiment, the step of acquiring a weight of each piece of the semantic feature information includes steps of:

acquiring an intermediate feature variable of each piece of the semantic feature information;

acquiring a training vector of each piece of the semantic feature information by using a preset exponential function, with a product of the intermediate feature variable of each piece of the semantic feature information and a preset fourth neural parameter as a parameter;

acquiring a sum of the training vectors according to the summation function; and dividing the training vector of each piece of the semantic feature information by the sum of the training vectors, to acquire the weight of each piece of the semantic feature information.

It should be noted that the intermediate feature variable of each piece of the semantic feature information is obtained by training each piece of the semantic feature information according to neural parameters of the neural network model until convergence. The preset exponential function is an exponential function exp with e as the base. The preset fourth neural parameter may be acquired by learning and training with a backpropagation algorithm.

For example, the preset fourth neural parameter is as $\in R^{1\times 256}$ follows (the preset fourth neural parameter is only part of the actual neural parameters and is merely illustrative):

[−10.38568, −12.86858, −8.71831, . . . , 16.83691, −32.90591, −18.87988, 81.63823]

In this example embodiment, calculation is performed with the product of the acquired intermediate feature variable of each piece of the semantic feature information and the preset fourth neural parameter as an independent variable of the exponential function exp, and the result output by the exponential function exp is used as the training vector of each piece of the semantic feature information. Calculation is performed by using the sum of the training vectors as an independent variable of the summation function, and the result output by the summation function is used as the sum of the training vectors. The training vector of each piece of the semantic feature information in the foregoing step is divided by the sum of the training vectors of all the semantic feature information, to acquire the weight of each piece of the semantic feature information in the set of semantic feature information.

It should be noted that the intermediate feature variable of each piece of the semantic feature information is obtained by training each piece of the semantic feature information according to neural parameters of the neural network model until convergence. The training process includes steps of:

using a product of each piece of the semantic feature information and a preset fifth neural parameter as a parameter; and acquiring the intermediate feature variable of each piece of the semantic feature information by using the hyperbolic tangent function.

It should be noted that the preset fifth neural parameter may be acquired by learning and training with a backpropagation algorithm. The preset fifth neural parameter is a matrix with $R^{256 \times 256}$. For example, the preset fifth neural parameter is as follows (the preset fifth neural parameter is only part of the actual neural parameters and is merely illustrative):

−0.2523 0.5566 −0.2415 −0.0383 −0.3564 . . . 0.4328 −0.0436 0.2290

0.1592 0.2002 0.1707 0.3554 −0.8284 . . . 0.7904 −0.7714 0.5022

. . .

. . .

−0.4821 −0.2854 −0.0420 −0.4550 1.2705 . . . 1.2653 −0.1080 0.0293

−1.5639 −0.1994 1.3927 −0.3267 −0.4468 . . . 1.2280 −0.38703 1.0251

In this example embodiment, calculation is performed by using the product of each piece of the semantic feature information and the preset fifth neural parameter as an independent variable of the hyperbolic tangent function tan h, and the result output by the hyperbolic tangent function tan h is used as the intermediate feature variable of each piece of the semantic feature information.

The use of the hyperbolic tangent function tan h may cause the problem of vanishing gradient in the neural network. In order to eliminate such a phenomenon, an example implementation is proposed in the present disclosure. In this example implementation, after the step of using a product of each piece of the semantic feature information and a preset fifth neural parameter as a parameter, the product is normalized.

It should be noted that the normalization in this step uses a norm L1norm.

As an example implementation, in the method for generating a feature vector provided by the example embodiment of the present disclosure, a description of the whole text sentence is used as an input in the process of acquiring the feature vector of the data information, in order to output the feature vector. To better emphasize the generated feature vector of the text information, the main part of the text should be more prominent from the whole text. Therefore, it is necessary to carry out multiple iterations and introduce a memorized vector during the process of acquiring the feature vector. After the step of acquiring an intermediate feature variable of each piece of the semantic feature information, the method includes steps of:

using a product of a memorized vector and a preset sixth neural parameter as a parameter; and acquiring a memorized feature variable of the semantic feature information by using the hyperbolic tangent function.

It should be noted that the preset sixth neural parameter may be acquired by learning and training with a backpropagation algorithm. The preset sixth neural parameter is a matrix with $R^{256 \times 256}$. For example, the preset sixth neural parameter is as follows (the preset sixth neural parameter is only part of the actual neural parameters and is merely illustrative):

−1.0252 1.0688 0.0607 0.1820 −1.9922 . . . 0.1298 0.1749 −1.9271

−0.2448 0.690 1.5810 0.5936 3.0784 . . . 0.7467 0.9964 −0.9272

. . .

. . .

−1.3972 −0.266 1.2013 0.1290 −0.2179 . . . −09667 0.2926 1.1932

−0.3942 −1.1227 −0.2938 −0.2345 −1.1198 . . . −0.0975 09294 1.2903

In this example embodiment, calculation is performed by using the product of the memorized vector and the preset sixth neural parameter as an independent variable of the hyperbolic tangent function tan h, and the result output by the hyperbolic tangent function tan h is used as the memorized feature variable of the semantic feature information.

Likewise, since the use of the hyperbolic tangent function tan h may cause the problem of vanishing gradient in the neural network, after the step of using a product of the memorized vector and a preset sixth neural parameter as a parameter, the product is normalized with a norm L1norm.

As an example implementation, after the introduction of the memorized vector in the method for generating a feature vector provided by the example embodiment of the present disclosure, it is further necessary to introduce the memorized feature variable of the semantic feature information acquired based on the memorized vector into the intermediate feature variable of each piece of the semantic feature information, to emphasize the main part of the text information. Specifically, after the step of acquiring a memorized feature variable of the semantic feature information, the method includes a step of using a product of the intermediate feature variable of the semantic feature information and the memorized feature variable of the corresponding semantic feature information as a new intermediate feature variable of the semantic feature information.

In this example embodiment, the memorized feature variable of the semantic feature information may be acquired in the following manner:

acquiring a sum of the memorized feature information according to the summation function, with the semantic feature information as a parameter; and using the sum of the memorized feature information as the memorized feature vector of the data information.

In this example embodiment, the number of pieces of the semantic feature information in the set of semantic feature information is equal to the number of the segmented words. Therefore, the sum of the memorized feature information of the semantic feature information is acquired based on the summation function Σ, the number of pieces of the semantic feature information being equal to the number of segmented words. Calculation is performed by using the acquired sum of the memorized feature information as an independent variable of the hyperbolic tangent function, and the result output by the hyperbolic tangent function is used as the memorized feature variable of the data information.

In order to prevent the acquired memorized feature variable model of the semantic feature information from overfitting, an example implementation is proposed in the present disclosure. In the example implementation, after the step of acquiring a memorized feature variable of the semantic feature information, the memorized feature variable of the semantic feature information is again normalized.

It should be noted that the normalization in this step uses a norm L2norm. L2norm refers to an Euclidean distance, which denotes a true distance between two points in an m-dimensional space.

As an example implementation, in the method for generating a feature vector provided by the example embodiment of the present disclosure, in order to emphasize the main part of the text information, a second iteration should be performed on the data information after the semantic feature information of the data information is acquired through the first iteration. The method for generating a feature vector is performed again to repeat the above process.

During the second iteration, the memorized feature variable of the semantic feature information may be updated according to the number of iterations that have been performed. For example: The memorized feature variable of the semantic feature information is updated based on the feature vector of the semantic feature information acquired in the first iteration, and the updated memorized feature variable of the semantic feature information is substituted as a new parameter for repeating the steps in a second iteration. This specifically includes steps of:

acquiring the feature vector of the data information obtained in the previous iteration; and updating the memorized feature variable of the semantic feature information according to the feature vector of the data information obtained in the previous iteration.

An algorithm for updating the memorized feature variable of the semantic feature information is as follows:

$$m_v^{(k)} = m_v^{(k-1)} \| v^{(k)}$$

where $\|$ represents a feature concatenating operation, $m_v^{(k-1)}$ represents the memorized feature variable of the semantic feature information in the second iteration, and $v^{(k)}$ represents the feature vector of the data information in the previous iteration.

The process of acquiring the feature vector of the data information is described below by a particular example where the type of the data information is text.

After the extraction of feature information from the text information (e.g. the extracted feature information is: T-shirt, Korean, student, male), the resultant set of semantic feature information $(U_t)_{t=1}^T$ is as follows

−0.006019 0.00011 0.00094 −0.00356 . . . −0.00444 0.00501 0.00416

−0.00074 0.00783 −0.01861 −0.00209 . . . 0.00478 0.00066 −0.00065

−0.00387 0.00215 −0.01198 0.01411 . . . −0.00175 −0.00162 0.00049

0.00271 −0.00177 −0.00415 0.00237 . . . −0.00331 0.00307 −0.00189

It may be understood that the set $U_t$ includes 4 pieces of semantic feature information. Therefore, the set $U_t$ has 4 groups of data.

After being acquired, the semantic feature information $U_t$ is substituted into an algorithm for a memorized feature variable of the semantic feature information, to initialize the memorized feature variable.

The algorithm for acquiring the memorized feature variable of the semantic feature information includes:

$$m_u^{(0)} = L2norm\left(\sum_{t=1}^T U_t\right)$$

where $U_t$ represents the semantic feature information, the symbol $\Sigma$ represents the summation function, the letter T (T=4) represents the total number of pieces of the semantic feature information, and the symbol L2norm represents a norm.

The semantic feature information $U_t$ is substituted into the algorithm above, and after summation and normalization with L2norm, the finally acquired $m_u^{(1)}$ is as follows:

[−0.03941, 0.04139, −0.16823 . . . 0.01032, 0.03543, −0.02356, −0.02652]

After being acquired, the memorized feature variable of the semantic feature information is substituted into the algorithm for acquiring an intermediate feature variable, to obtain the intermediate feature variable.

The algorithm for acquiring the intermediate feature variable includes:

$$h_{u,n}^{(k)} = \tan h(L1norm(w_u^{(k)} U_t)) \otimes \tan h(L1norm(w_{u,n}^{(k)} m_u^{(k-1)}))$$

where the letters u, n represent a specific piece of the semantic feature information, the letter k (k=1) represents the number of iterations, the symbol L1norm represents a norm, tan h represents the hyperbolic tangent function, $w_u^{(k)}$ represents the preset fifth neural parameter, $w_{u,n}^{(k)}$ represents the preset sixth neural parameter, $U_t$ represents the semantic feature information, $m_u^{(k-1)}$ represents the memorized feature variable, and $h_{u,n}^{(k)}$ represents the intermediate feature variable.

It should be noted that the preset fifth neural parameter may be acquired by learning and training with a backpropagation algorithm. The preset fifth neural parameter is a matrix with $R^{256 \times 256}$. For example, the preset fifth neural parameter is as follows (the preset fifth neural parameter is only part of the actual neural parameters and is merely illustrative):

−0.2523 0.5566 −0.2415 −0.0383 −0.3564 . . . 0.4328 −0.0436 0.2290

0.1592 0.2002 0.1707 0.3554 −0.8284 . . . 0.7904 −0.7714 0.5022

. . .

. . .

−0.4821 −0.2854 −0.0420 −0.4550 1.2705 . . . 1.2653 −0.1080 0.0293

−1.5639 −0.1994 1.3927 −0.3267 −0.4468 . . . 1.2280 −0.38703 1.0251

The preset sixth neural parameter may be acquired by learning and training with a backpropagation algorithm. The preset sixth neural parameter is a matrix with $R^{256 \times 256}$. For example, the preset sixth neural parameter is as follows (the preset sixth neural parameter is only part of the actual neural parameters and is merely illustrative):

−1.0252 1.0688 0.0607 0.1820 −1.9922 . . . 0.1298 0.1749 −1.9271

−0.2448 0.690 1.5810 0.5936 3.0784 . . . 0.7467 0.9964 −0.9272

. . .

. . .

−1.3972 −0.266 1.2013 0.1290 −0.2179 . . . −09667 0.2926 1.1932

−0.3942 −1.1227 −0.2938 −0.2345 −1.1198 . . . −0.0975 09294 1.2903

The finally obtained $h_{u,n}^{(1)}$, i.e. the intermediate feature variable of the semantic feature information, is as follows:

−8.10e-07 3.02e-07 −7.07e-06 2.00e-06 . . . −1.33e-06 7.40e-07 6.13e-04

−4.79e-07 5.17e-07 1.30e-06 1.29e-07 . . . 4.85e-06 2.21e-07 −2.80e-03

−4.39e-07 1.87e-07 1.63e-06 1.06e-07 . . . 6.93e-07 1.23er-07 −2.43e-04

5.46e-07 −2.02e-07 −1.73e-06 2.82e-07 . . . −5.48e-06 6.67e-07 −2.40e-04

After being acquired, the intermediate feature variable of the semantic feature information is substituted into the algorithm for acquiring a weight of each piece of the semantic feature information, to obtain the weight:

$$\alpha_{u,t}^{(k)} = \frac{\exp(w_{u,n}^{(k)} h_{u,n}^{(k)})}{\sum_{t'=1}^{T} \exp(w_{v,nu}^{(k)} h_{u,n'}^{(k)})}$$

where the letters u, n represent a specific piece of the semantic feature information, the letter k(k=1) represents the number of iterations, the letter T(T=4) represents the total number of pieces of the semantic feature information, t' represents a specific piece of the semantic feature information, the symbol $\Sigma$ represents the summation function, exp represents the exponential function with e as the base, $w_{u,n}^{(k)}$ represents the preset fourth neural parameter, $h_{u,n}^{(k)}$ represents the intermediate feature variable, and $\alpha_{u,t}^{(k)}$ represents the weight of each piece of the semantic feature information.

It should be noted that the preset fourth neural parameter $\in R^{1 \times 256}$ is as follows (the preset fourth neural parameter is only part of the actual neural parameters and is merely illustrative):

[−10.38568, −12.86858, −8.71831, . . . , 16.83691, −32.90591, −18.87988, 81.63823]

The finally obtained weight $\alpha_{u,t}^{(1)}$ of each piece of the semantic feature information is as follows:

[0.71735, 0.06065, 0.05732, 0.16466]

It should be noted that, since $\alpha_{u,t}^{(1)}$ represents the weight of each piece of the semantic feature information, $\alpha_{u,t}^{(1)}$ has 4 (which is equal to the value of N) values.

After being acquired, the weight of each piece of the semantic feature information is substituted into the algorithm for acquiring a feature vector of the data information, to obtain the feature vector of the data information.

The algorithm for the feature vector of the data information includes:

$$u^{(k)} = L2norm\left(\sum_{t=1}^{T} \alpha_{u,t}^{(k)} U_t\right)$$

where $U_t$ represents the semantic feature information, $\alpha_{u,t}^{(k)}$ represents the weight of each piece of the semantic feature information, the symbol represents the summation function, and the symbol L2norm represents a norm, with T=4 and k=1.

The finally obtained $u^{(1)}$, i.e. the feature vector of the semantic feature information, is as follows:

[−0.05899, 0.00551, −0.02597, . . . −0.00399, −0.05053, 0.05775, 0.03763]

After the first iteration with k=1, the obtained feature vector $u^{(1)}$ is substituted into the algorithm for a memorized feature variable of the semantic feature information, to carry out a second iteration.

As the computing process with k=2 is substantially the same as the process with k=1, this computing process is not described again.

As an example implementation, in the method for generating a feature vector provided by the example embodiment of the present disclosure, after step S106 of acquiring a feature vector of the data information by using a preset function, with the semantic feature information as a parameter, it is further necessary to train the data information based on a similarity model, which specifically includes a step of:

acquiring a feature vector of another data information relative to the data information according to the type of the data information.

It may be understood that if the data information is text information, a feature vector of corresponding image information is acquired. Likewise, if the data information is image information, a feature vector of corresponding text information is acquired.

In particular, a text feature vector of the data information is Vimage=$v^{(0)} \| v^{(1)}$.

An image feature vector of the data information is Vtest=$u^{(0)} \| u^{(1)}$.

For example, when uploading image information, a user may provide a description of the image information, so that text information about the image information may be acquired. Therefore, acquiring a feature vector of another data information relative to the data information corresponding to the data information means acquiring a text feature vector or an image feature vector of the another data information relative to the data information.

It should be noted that for the same piece of data information, its own text feature vector and image feature vector may be referred to as a positive sample pair; feature vectors of the another data information relative to the data information may be referred to as a negative sample pair.

For example, a text feature vector of the data information and an image feature vector of the another data information relative to the data information form a negative sample pair; an image feature vector of the data information and a text feature vector of the another data information relative to the data information also form a negative sample pair.

After the step of acquiring a feature vector of the another data information relative to the data information, a similarity between the another data information relative to the data information and the data information is calculated according to the acquired feature vector of the another data information relative to the data information. This specifically includes a step of:

calculating a similarity between the another data information relative to the data information and the data information based on the feature vector of the another data information relative to the data information.

In this example embodiment, the calculation of the similarity between the another data information relative to the data information and the data information based on the feature vector of the another data information relative to the data information may be implemented in the following manner: calculating a similarity between the another data information relative to the data information and the data information based on a text feature vector of the data information and an image feature vector of the another data information relative to the data information; calculating a similarity between the another data information relative to the data information and the data information based on an image feature vector of the data information and a text feature vector of the another data information relative to the data information; calculating a similarity between the another data information relative to the data information and the data information based on the text feature vector of the data information and the image feature vector of the data information; and calculating a similarity between the another data information relative to the data information and the data information based on the text feature vector of the another data information relative to the data information and the image feature vector of the another data information relative to the data information.

The algorithm for calculating the similarity between the another data information relative to the data information and the data information includes:

The algorithm for calculating the similarity between the another data information relative to the data information and the data information includes:

$$L = \sum \{\max(0, \mu - S(V_{image}^i, V_{text}^j) + S(V_{image}^j, V_{text}^i)) + \max(0, \mu - S(V_{image}^i, V_{text}^j) + S(V_{image}^j, V_{text}^i))\}$$

where L represents the similarity between the another data information relative to the data information and the data information, max represents taking a maximum value, the symbol $\mu$ represents a similarity threshold, the symbol i represents the data information, the symbol j represents the another data information relative to the data information, $V_{image}$ represents a feature vector of image information, and $V_{text}$ represents a feature vector of text information.

In particular, the image information and text information (i, i) are a positive sample pair, while (i, j) are a negative sample pair, and $\mu$ is a constant threshold value for the difference between similarity scores of the positive pair and the negative pair and may be set according to different application scenarios. By minimizing the target function mentioned above, a high similarity score may be achieved between an image and a text relevant to each other, while the similarity score between an image and a text irrelevant to each other is low.

The training data in use is positive and negative sample pairs of images and texts. Therefore, the function L here may also be designed to be a binary classification function for the positive and negative pairs. It has been found in experiments that the use of a ranking loss function here may achieve a better effect than a binary classification target function. The reasons lie in that: (1) The ranking loss function aims to directly optimize the inner product or the Euclidean distance between an image vector and a text vector, and this is consistent with the final retrieval ordering. (2) A threshold for the difference between the similarity scores of the positive and negative sample pairs is preset in the ranking loss function, and when the threshold is met, the gradient of the backpropagation is zero, mitigating the overfitting of the model. However, the design of a binary classification target function cannot avoid the problem of overfitting. Therefore, the ranking loss function is used as the target function of the whole network in the final design, and excellent effects are achieved in actual applications.

The computing process of the target function L is described below by using a particular example.

A modified Caffe frame is used for model training, with the batchsize set to 1024 and the similarity score difference $\mu = 0.15$.

$$L = \sum_{i,j=1, i \neq j}^{1024} \max(0, 0.15 - 6.6347 + 0.5743) + \\ \max(0, 0.15 - 0.6437 + (-0.0486)) + \ldots$$

Finally, L=9878.46.

Figure 2:
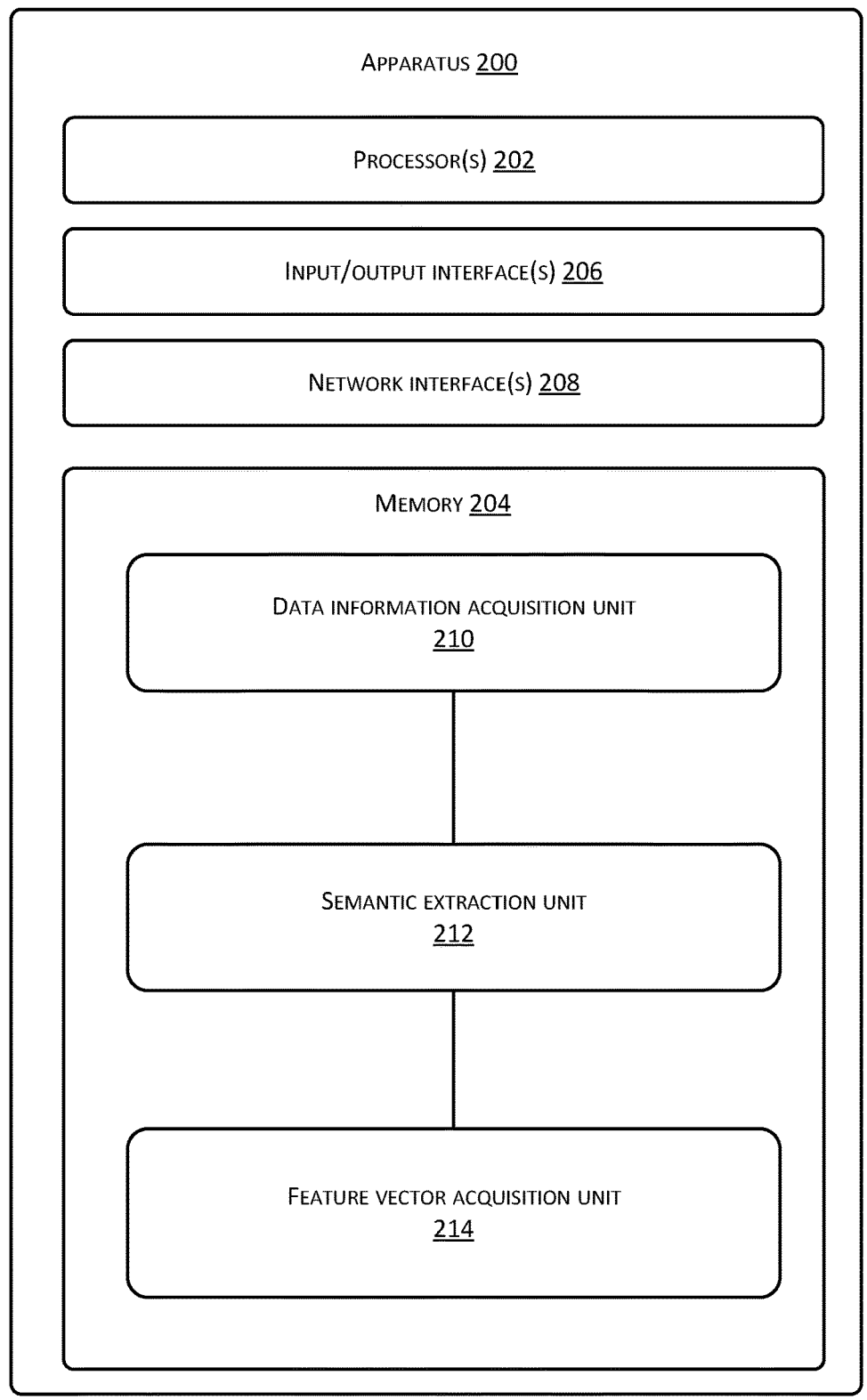
FIG. 2 is a schematic diagram of an apparatus for generating a feature vector according to an example embodiment of the present disclosure.

A method for generating a feature vector is provided in the example embodiment above. The present disclosure also provides an apparatus for generating a feature vector, corresponding to the method above. As the example embodiment of the apparatus is described briefly because it is basically similar to the method example embodiment. Reference may be made to the relevant content in the method example embodiment. The apparatus example embodiment described below is merely illustrative. The example embodiment of the apparatus for generating a feature vector is as follows:

Referring to FIG. 2, a schematic diagram of an apparatus 200 for generating a feature vector according to an example embodiment of the present disclosure is shown.

The apparatus 200 includes one or more processor(s) 202 or data processing unit(s) and memory 204. The apparatus 200 may further include one or more input/output first iteration, and the updated memorized feature variable of interface(s) 206 and one or more network interface(s) 208. The memory 204 is an example of computer readable media.

The memory 204 may store therein a plurality of modules or units including: a data information acquisition unit 210, a semantic extraction unit 212 and a feature vector acquisition unit 214.

The data information acquisition unit 210 is configured to acquire data information.

The semantic extraction unit 212 is configured to extract a semantic feature from the data information to acquire semantic feature information.

The feature vector acquisition unit 214 is configured to acquire a feature vector of the data information by using a preset function, with the semantic feature information as a parameter.

Optionally, the semantic extraction unit 212 is specifically configured to extract a semantic feature from the data information by using a preset neural network model.

Optionally, the semantic extraction unit 212 is specifically configured to extract the semantic feature from the data information by using a ResNet-152 neural network model.

Optionally, the feature vector acquisition unit 214 includes:

a function setting subunit configured to set a function and variables of the function according to the type of the data information; and a feature vector acquisition subunit configured to acquire the feature vector of the data information by using the function, with the semantic feature information as a parameter.

Optionally, the function setting subunit is specifically configured to set a summation function and a hyperbolic tangent function according to the type of the data information.

Optionally, the data information acquisition unit 210 is specifically configured for text information and image information.

Optionally, when the data information is image information, the semantic extraction unit 212 includes:

a splitting subunit configured to split the data information based on a feature of a preset level of the neural network model; and a semantic extracting subunit configured to acquire each piece of the split semantic feature information.

Optionally, when the data information is image information, the function setting subunit 203 is specifically configured to set a hyperbolic tangent function having a preset feature matrix and a summation function according to the type of the data information.

Optionally, the feature vector acquisition unit 214 includes:

a summation subunit configured to acquire a sum of the semantic feature information according to the summation function;

a training subunit configured to train the sum of the semantic feature information according to the preset feature matrix, to acquire a training result; and a feature vector acquisition subunit configured to acquire the feature vector of the data information according to the hyperbolic tangent function, with the training result as a parameter.

Optionally, the feature vector acquisition unit 214 includes:

a weight acquisition subunit configured to acquire a weight of each piece of the semantic feature information before the sum of the semantic feature information is acquired according to the summation function.

Optionally, the weight acquisition unit includes:

an intermediate feature variable acquisition subunit configured to acquire an intermediate feature variable of each piece of the semantic feature information;

a training vector acquisition subunit configured to acquire a training vector of each piece of the semantic feature information by using a preset exponential function, with a product of the intermediate feature variable of each piece of the semantic feature information and a preset first neural parameter as a parameter;

a vector summation subunit configured to acquire a sum of the training vectors according to the summation function; and a weight obtaining subunit configured to divide the training vector of each piece of the semantic feature information by the sum of the training vectors, to obtain the weight of each piece of the semantic feature information.

Optionally, the training vector acquisition subunit is specifically configured to acquire the training vector of each piece of the semantic feature information by using an exponential function using e as the base, with the product of the intermediate feature variable of each piece of the semantic feature information and the preset first neural parameter as a parameter.

Optionally, the intermediate feature variable acquisition unit includes:

a product subunit configured to use a product of each piece of the semantic feature information and a preset second neural parameter as a parameter; and an intermediate feature acquisition subunit configured to acquire the intermediate feature variable of each piece of the semantic feature information by using the hyperbolic tangent function.

Optionally, the intermediate feature variable acquisition subunit also includes:

a normalizing subunit configured to normalize the product of each piece of the semantic feature information and the preset second neural parameter after the product is used as a parameter.

Optionally, the normalizing subunit is specifically configured to normalize the product of each piece of the semantic feature information and the preset second neural parameter with a norm L1norm after the product is used as a parameter.

Optionally, the intermediate feature variable acquisition subunit also includes:

a memorized vector product subunit configured to use a product of the memorized vector and a preset third neural parameter as a parameter, after the intermediate feature variable of each piece of the semantic feature information is acquired; and a memorized feature variable acquisition subunit configured to acquire the memorized feature variable of the semantic feature information by using the hyperbolic tangent function.

Optionally, the intermediate feature variable acquisition subunit also includes:

a memorized vector normalizing subunit configured to normalize the product of the memorized vector and the preset third neural parameter after the product is used as a parameter.

Optionally, the memorized vector normalizing subunit is specifically configured to normalize the product of memorized vector and the preset third neural parameter with a norm L1norm after the product is used as a parameter.

Optionally, the intermediate feature variable acquisition subunit also includes:

an updating subunit configured to use a product of the intermediate feature variable of the semantic feature information and the memorized feature variable of the corresponding semantic feature information as a new intermediate feature variable of the semantic feature information, after the memorized feature variable of the semantic feature information is acquired.

Optionally, the memorized feature variable acquisition unit includes:

a semantic feature summation subunit configured to acquire a sum of the semantic feature information according to the summation function;

an averaging subunit configured to acquire an average of the sum of the semantic feature information according to the number of pieces of the semantic feature information;

an average training subunit configured to train the average of the sum of the semantic feature information according to the preset feature matrix, to acquire a training result; and a memorized feature acquisition subunit configured to acquire the memorized feature variable of the semantic feature information by using the hyperbolic tangent function, with the training result as a parameter.

Optionally, the memorized feature variable acquisition unit also includes:

a normalizing subunit configured to normalize the training result after the training result is acquired.

Optionally, the normalizing subunit is specifically configured to normalize the training result with a norm L1norm after the training result is acquired.

Optionally, the memorized feature variable acquisition unit also includes:

a second normalizing subunit configured to normalize the memorized feature variable of the semantic feature information after the memorized feature variable of the semantic feature information is acquired.

Optionally, the second normalizing subunit is specifically configured to normalize the memorized feature variable of the semantic feature information with a norm L2norm after the memorized feature variable of the semantic feature information is acquired.

Optionally, the memorized feature variable acquisition unit also includes:

an iteration subunit configured to update the memorized feature variable of the semantic feature information according to the number of iterations.

Optionally, the iteration subunit includes:

a feature vector acquisition subunit configured to acquire the feature vector of the data information obtained in the previous iteration; and an updating subunit configured to update the memorized feature variable of the semantic feature information according to the feature vector of the data information obtained in the previous iteration.

Optionally, the apparatus for generating a feature vector also includes:

a compression unit configured to compress the acquired data information to a preset size, if the acquired data information is image information.

Optionally, the semantic extraction unit includes:

a text vector acquisition subunit configured to perform word segmentation on the text information to acquire a text vector, if the data information is text information; and use the text vector as the semantic feature information.

Optionally, when the data information is text information, the function setting subunit is specifically configured to set a hyperbolic tangent function and a summation function according to the type of the data information.

Optionally, the feature vector acquisition unit includes:

a summation subunit configured to acquire a sum of the semantic feature information according to the summation function, with the semantic feature information as a parameter; and a feature vector acquisition subunit configured to use the sum of the semantic feature information as the feature vector of the data information.

Optionally, the feature vector acquisition unit includes:

a weight acquisition subunit configured to acquire a weight of each piece of the semantic feature information before the sum of the semantic feature information is acquired according to the summation function.

Optionally, the weight acquisition unit includes:

an intermediate feature variable acquisition subunit configured to acquire an intermediate feature variable of each piece of the semantic feature information;

a training vector acquisition subunit configured to acquire a training vector of each piece of the semantic feature information by using a preset exponential function, with a product of the intermediate feature variable of each piece of the semantic feature information and a preset fourth neural parameter as a parameter;

a vector summation subunit configured to acquire a sum of the training vectors according to the summation function; and a weight obtaining subunit configured to divide the training vector of each piece of the semantic feature information by the sum of the training vectors, to obtain the weight of each piece of the semantic feature information.

Optionally, the training vector acquisition subunit is specifically configured to acquire the training vector of each piece of the semantic feature information by using an exponential function using e as the base, with the product of the intermediate feature variable of each piece of the semantic feature information and the preset fourth neural parameter as a parameter.

Optionally, the intermediate feature variable acquisition unit includes:

a product subunit configured to use a product of each piece of the semantic feature information and a preset fifth neural parameter as a parameter; and an intermediate feature acquisition subunit configured to acquire the intermediate feature variable of each piece of the semantic feature information by using the hyperbolic tangent function.

Optionally, the intermediate feature variable acquisition subunit also includes:

a normalizing subunit configured to normalize the product of each piece of the semantic feature information and the preset fifth neural parameter after the product is used as a parameter.

Optionally, the normalizing subunit is specifically configured to normalize the product of each piece of the semantic feature information and the preset fifth neural parameter with a norm L1norm after the product is used as a parameter.

Optionally, the intermediate feature variable acquisition subunit also includes:

a memorized vector product subunit configured to use a product of the memorized vector and a preset sixth neural parameter as a parameter, after the intermediate feature variable of each piece of the semantic feature information is acquired; and a memorized feature variable acquisition subunit configured to acquire the memorized feature variable of the semantic feature information by using the hyperbolic tangent function.

Optionally, the intermediate feature variable acquisition subunit also includes:

a memorized vector normalizing subunit configured to normalize the product of the memorized vector and the preset sixth neural parameter after the product is used as a parameter.

Optionally, the memorized vector normalizing subunit is specifically configured to normalize the product of memorized vector and a preset sixth neural parameter with a norm L1norm after the product is used as a parameter.

Optionally, the intermediate feature variable acquisition subunit also includes:

an updating subunit configured to use a product of the intermediate feature variable of the semantic feature information and the memorized feature variable of the corresponding semantic feature information as a new intermediate feature variable of the semantic feature information, after the memorized feature variable of the semantic feature information is acquired.

Optionally, the memorized feature variable acquisition unit includes:

a semantic feature summation subunit configured to acquire a sum of the memorized feature information according to the summation function, with the semantic feature information as a parameter; and a memorized feature acquisition subunit configured to use the sum of the memorized feature information as the memorized feature vector of the data information.

Optionally, the memorized feature variable acquisition unit also includes:

a normalizing subunit configured to normalize the sum of the memorized feature information after the sum of the memorized feature information is acquired.

Optionally, the normalizing subunit is specifically configured to normalize the sum of the memorized feature information with a norm L2norm after the sum of the memorized feature information is acquired.

Optionally, the memorized feature variable acquisition unit also includes:

an iteration subunit configured to update the memorized feature variable of the semantic feature information according to the number of iterations.

Optionally, the iteration subunit includes:

a feature vector acquisition subunit configured to acquire the feature vector of the data information obtained in the previous iteration; and an updating subunit configured to update the memorized feature variable of the semantic feature information according to the feature vector of the data information obtained in the previous iteration.

Optionally, the apparatus for generating a feature vector includes:

a sample acquisition unit configured to acquire a feature vector of another data information relative to the data information according to the type of the data information, after the feature vector of the data information is acquired.

Optionally, the apparatus for generating a feature vector includes:

a similarity calculation unit configured to calculate a similarity between the another data information relative to the data information and the data information based on the feature vector of the another data information relative to the data information, after the feature vector of the another data information relative to the data information is acquired.

Figure 3:
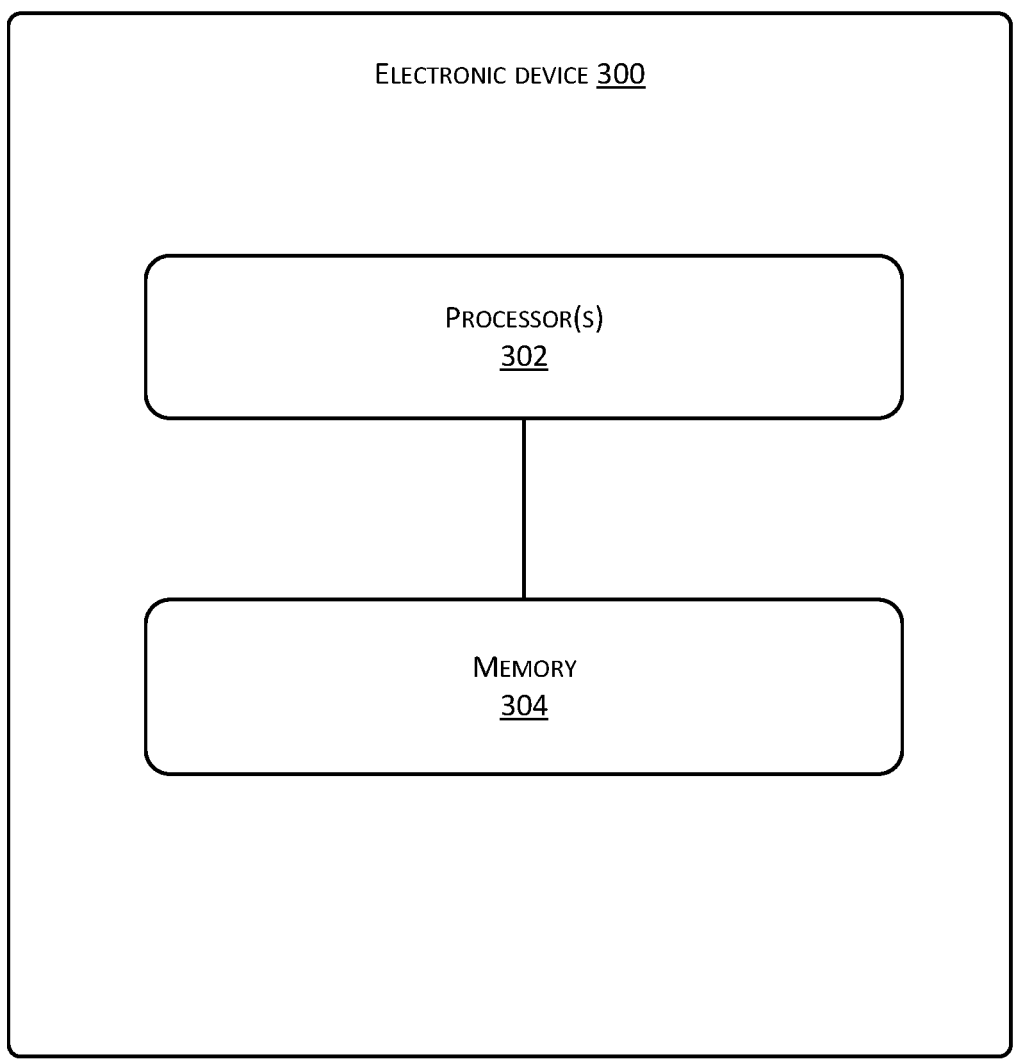
FIG. 3 is a schematic diagram of an electronic device according to an example embodiment of the present disclosure.

A method and an apparatus for generating a feature vector are provided in the example embodiments above. In addition, the present disclosure also provides an associated electronic device. The example embodiment of the electronic device is as follows:

Referring to FIG. 3, a schematic diagram of an electronic device 300 according to an example embodiment of the present disclosure is shown.

The electronic device 300 includes: one or more processor 302; and a memory 304.

The memory 304 is configured to store a program for generating a feature vector, the program performing the following operations when read and executed by the processor: acquiring data information; extracting a semantic feature from the data information, to acquire semantic feature information; and acquiring a feature vector of the data information by using a preset function, with the semantic feature information as a parameter.

Figure 4:
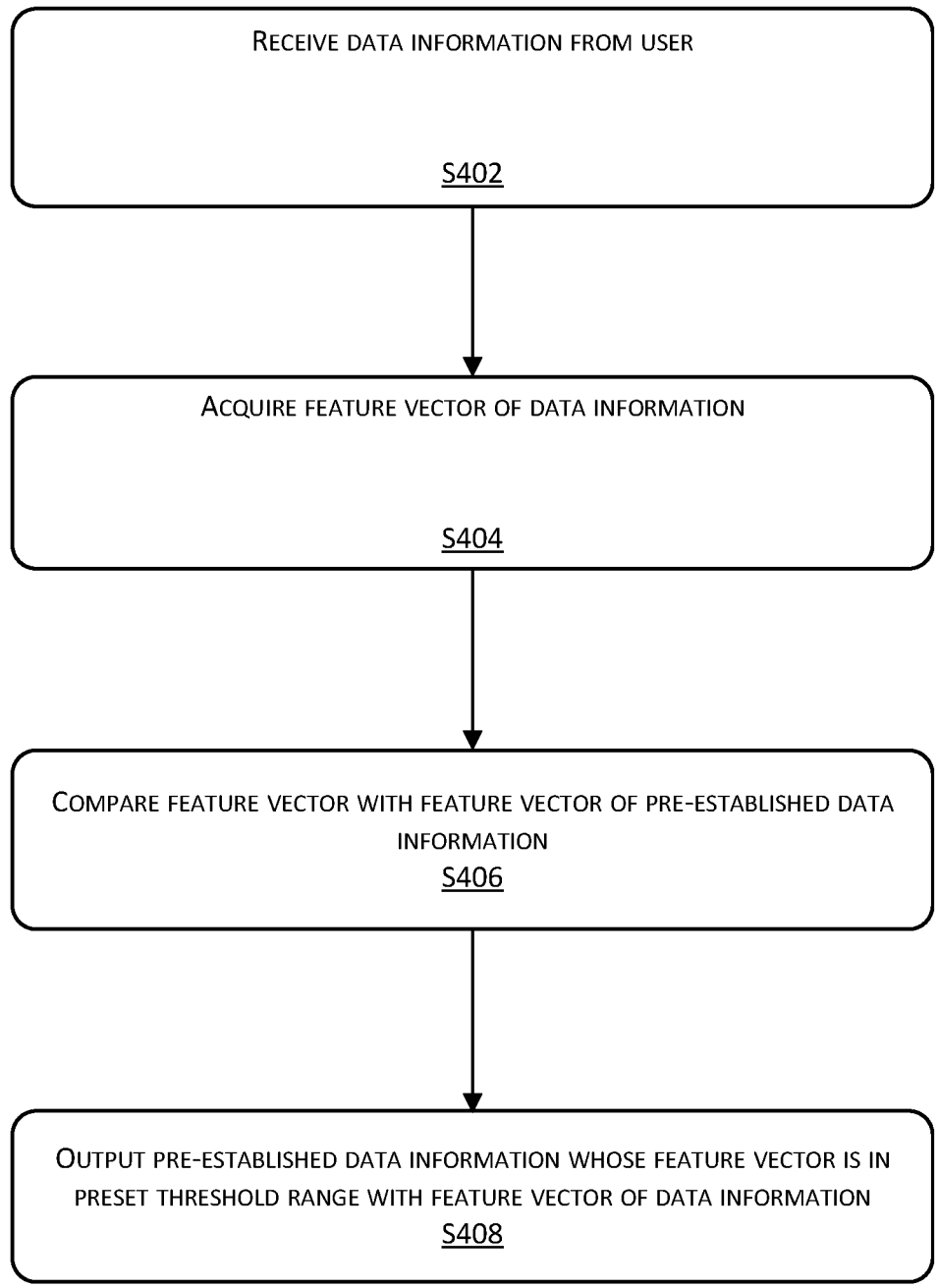
FIG. 4 is a flowchart of a searching method according to an example embodiment of the present disclosure.

A method and an apparatus for generating a feature vector as well as an associated electronic device are provided in the example embodiments above. In addition, the present disclosure also provides a searching method. The example embodiment of the searching method is as follows:

Referring to FIG. 4, a flowchart of a searching method according to an example embodiment of the present disclosure is shown.

S402: Data information from a user is received.

In this example embodiment, the step of acquiring data information may be implemented in the following manner: acquiring data information input or uploaded by a user.

It should be understood that the data information may be text information or image information. Therefore, in this step, text information input by a user or image information uploaded by a user may be acquired.

S404: A feature vector of the data information is acquired.

In this example embodiment, the step of acquiring a feature vector of the data information may be implemented in the following manner: acquiring the feature vector of the data information by applying the method for generating a feature vector.

A detailed description has been provided in the example embodiment above. For specific content, reference may be made to the foregoing example embodiment. Details are not described here again.

S406: The feature vector is compared with a feature vector of pre-established data information.

In this example embodiment, the step of comparing the feature vector with a feature vector of pre-established data information may be implemented in the following manner: calculating a similarity between the feature vector and the feature vector of the pre-established data information.

An algorithm for calculating the similarity between the feature vector and the feature vector of the pre-established data information includes:

$$S(V_{image}, V_{text})$$

where $V_{image}$ represents the feature vector of the pre-established data information, and $V_{text}$ represents the feature vector of the input data information.

For example, with an image coding model, a feature vector of pre-established data information A may be extracted:

[0.0571, 0.0267, 0.0168 . . . 0.0485]

Likewise, with an image coding model, a feature vector of pre-established data information B may be extracted:

[0.0258, −0.0016, 0.0278 . . . 0.1082]

After the calculation of similarity according to the vectors, the feature vector of the pre-established data information A is 0.609, and the feature vector of the pre-established data information B is 0.504.

It should be noted that the feature vector of the pre-established data information is a feature vector of image information pre-established by applying the method for generating a feature vector.

In this example embodiment, in order to reduce the storage space occupied by the feature vector of the pre-established image information, an example implementation is provided in the present disclosure. In this example implementation, the feature vector of the pre-established image information is processed by using Hash, quantification, and so on, to be converted into a format recognizable to indexing engines, for reducing the occupied storage space.

S408: Pre-established data information, whose feature vector is in a preset threshold range with the feature vector of the data information, is output.

In this example embodiment, the step of outputting pre-established data information whose feature vector is in a preset threshold range with the feature vector of the data information may be implemented in the following manner:

outputting the pre-established data information in order of distance to the feature vector.

Figure 5:
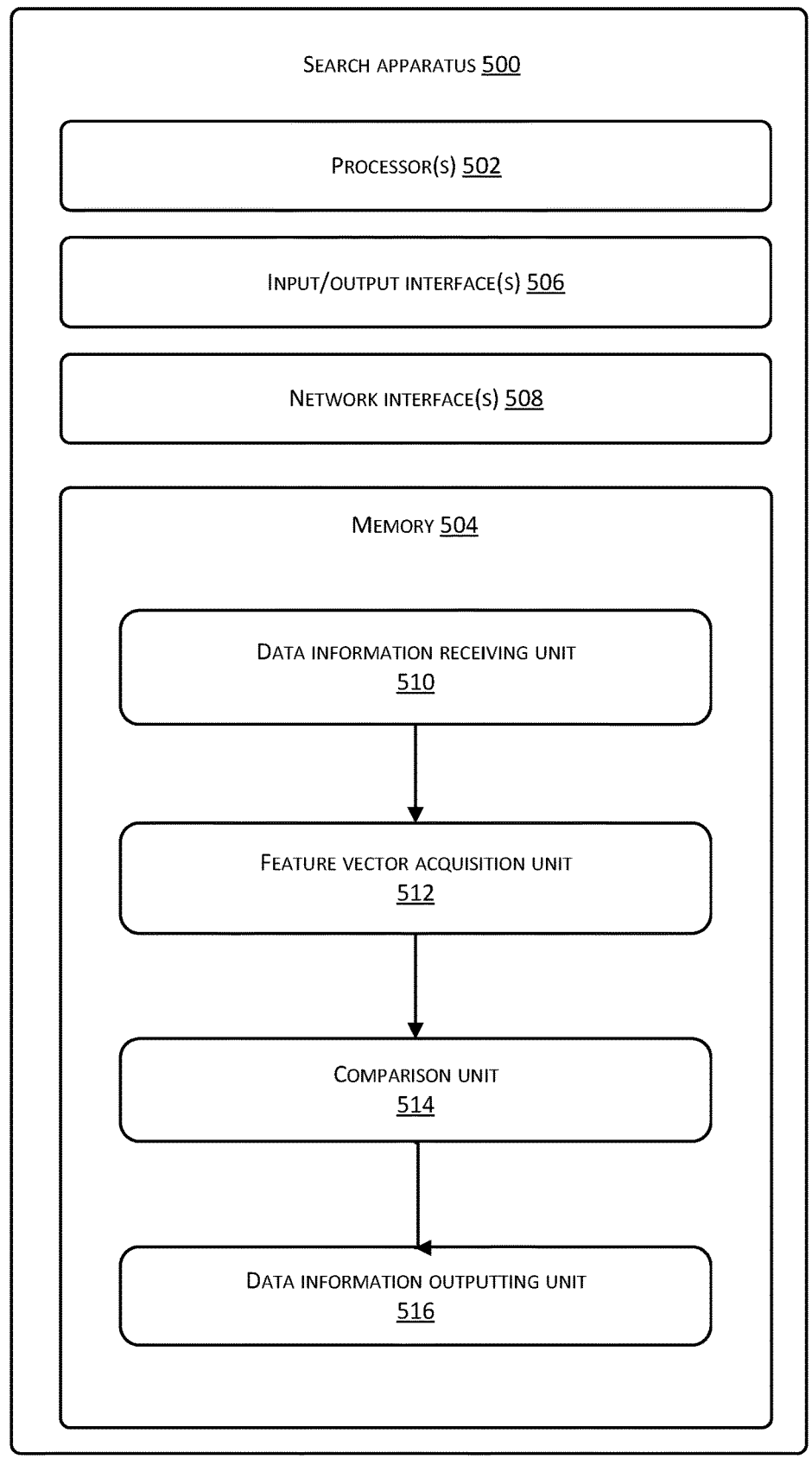
FIG. 5 is a schematic diagram of a searching apparatus according to an example embodiment of the present disclosure.

A searching method is provided in the example embodiment above. The present disclosure also provides a searching apparatus corresponding to the searching method above. The apparatus example embodiment is described briefly because it is basically similar to the method example embodiment. Reference may be made to the relevant content in the method example embodiment. The apparatus example embodiment described below is merely illustrative. The example embodiment of the searching apparatus is as follows:

Referring to FIG. 5, a schematic diagram of a searching apparatus 500 according to an example embodiment of the present disclosure is shown. The searching apparatus 500 includes one or more processor(s) 502 or data processing unit(s) and memory 504. The searching apparatus 500 may further include one or more input/output interface(s) 506 and one or more network interface(s) 508. The memory 504 is an example of computer readable media.

The memory 504 may store therein a plurality of modules or units including:

a data information receiving unit 510 configured to receive input data information;

a feature vector acquisition unit 512 configured to acquire a feature vector of the data information;

a comparison unit 514 configured to compare the feature vector with a feature vector of pre-established data information; and a data information outputting unit 516 configured to output pre-established data information whose feature vector is in a preset threshold range with the feature vector of the data information.

Optionally, the data information receiving unit 510 is specifically configured to receive input text information or image information.

Optionally, the feature vector acquisition unit 512 is configured to acquire the feature vector of the data information by applying the method for generating a feature vector.

Optionally, the comparison unit 514 is configured to compare the feature vector with a feature vector of image information pre-established by applying the method for generating a feature vector.

Optionally, the comparison unit 514 is configured to calculate a similarity between the feature vector and the feature vector of the pre-established data information.

Optionally, the data information outputting unit 516 is configured to output the pre-established data information in order of distance to the feature vector.

Figure 6:
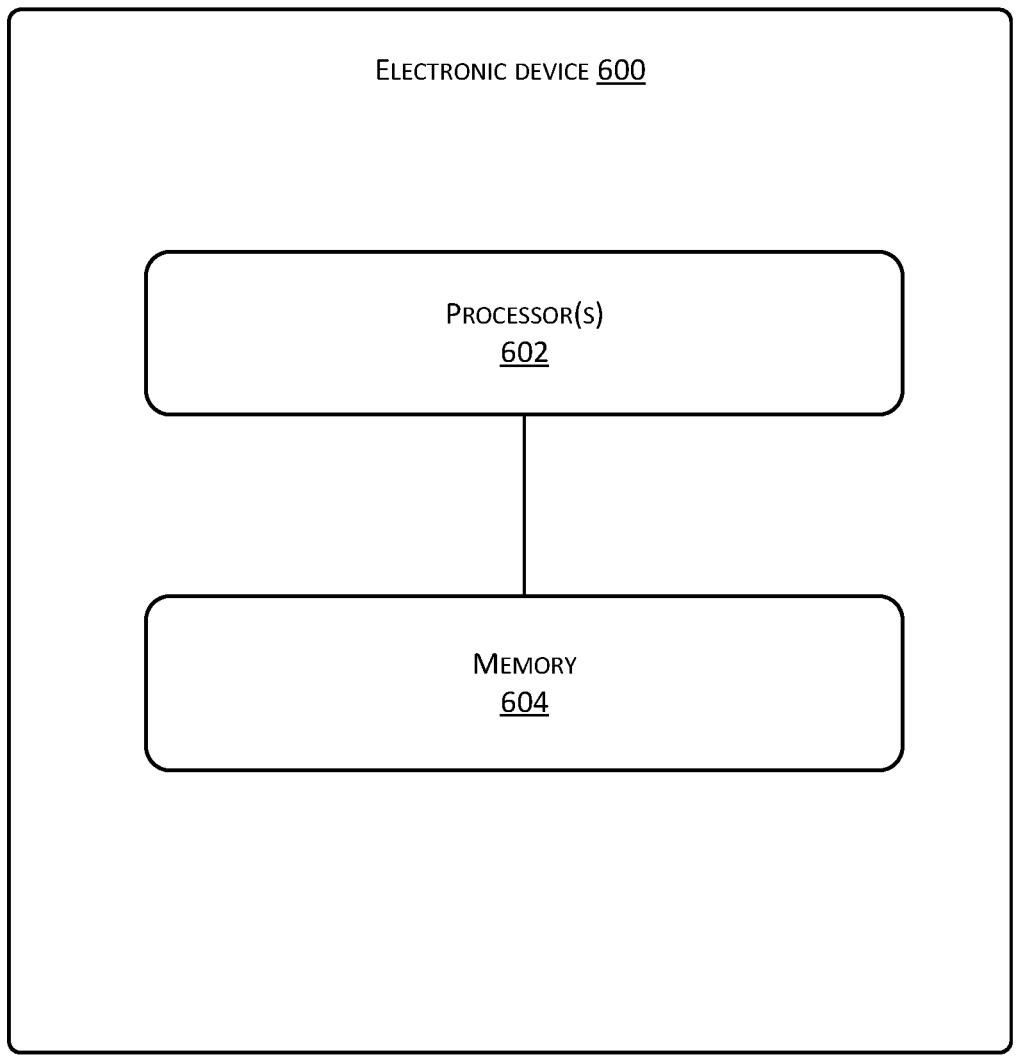
FIG. 6 is a schematic diagram of an electronic device according to an example embodiment of the present disclosure.

A method and an apparatus for generating a feature vector, an associated electronic device, a searching method, and a searching apparatus are provided in the example embodiments above. In addition, the present disclosure also provides an associated electronic device. The example embodiment of the searching electronic device is as follows:

Referring to FIG. 6, a schematic diagram of an electronic device 600 according to an example embodiment of the present disclosure is shown.

The electronic device 600 includes:

one or more processors 602; and a memory 604 configured to store a program for outputting data information, the program performing the following operations when read and executed by the processor: receiving data information from a user; acquiring a feature vector of the data information; comparing the feature vector with a feature vector of pre-established data information; and outputting pre-established data information whose feature vector is in a preset threshold range with the feature vector of the data information.

In a typical configuration, a computing device includes one or more processors (CPUs), an input/output port, a network interface and a memory.

The memory may include computer readable media, in the form of a volatile memory, a random access memory (RAM), and/or a non-volatile memory, such as a read-only memory (ROM) or flash RAM. The memory is an example of computer readable media.

1. The computer readable media include non-volatile and volatile, removable and fixed media which may use any method or technology for storing information. Information may be computer readable instructions, data structures, modules of a program or other data. The examples of a computer storage medium include, but not limited to, a phase-change random access memory (PRAM), a static random access memory (SRAM), a dynamic random access memory (DRAM), other types of RAMs, a ROM, an electrically erasable programmable read-only memory (EEPROM), a flash memory or other memory technologies, a compact disc read-only memory (CD-ROM), a digital versatile disc (DVD) or other optical storages, a cassette tape, a tape disk storage or other magnetic storage devices, or any other non-transmission medium which may be used for storing information to be accessed by a computing device. According to the definition here, the computer readable media do not include transitory media, such as modulated data signals and carrier waves.

2. A person skilled in the art should understand that the example embodiments of the present disclosure may be provided as a method, a system or a computer program product. Therefore, the present disclosure may take the form of an exclusively hardware example embodiment, an exclusively software example embodiment or an example embodiment combining software and hardware. Moreover, the present disclosure may employ the form of a computer program product that is implemented on one or more computer usable storage media (including, but not limited to, hard disk storages, CD-ROMs, optical storages, etc.) containing computer usable program code.

Although the present invention has been disclosed in the above example embodiments, the example embodiments are not intended to limit the present invention. A person skilled in the art may make possible variations and modifications without departing from the spirit and scope of the present invention. Therefore, the protection scope of the present invention should be subject to the scope defined by the claims.

The present disclosure may further be understood with clauses as follows.

Clause 1. A method for generating a feature vector, comprising:

acquiring data information;

extracting a semantic feature from the data information, to acquire semantic feature information; and acquiring a feature vector of the data information by using a preset function, with the semantic feature information as a parameter.

Clause 2. The method for generating a feature vector of clause 1, wherein the step of extracting a semantic feature from the data information comprises:

extracting the semantic feature from the data information by using a preset neural network model.

Clause 3. The method for generating a feature vector of clause 2, wherein the preset neural network model comprises: ResNet-152.

Clause 4. The method for generating a feature vector of clause 2, wherein the step of acquiring a feature vector of the data information by using a preset function, with the semantic feature information as a parameter, comprises:

setting a function and variables of the function according to the type of the data information; and acquiring the feature vector of the data information by using the function, with the semantic feature information as a parameter.

Clause 5. The method for generating a feature vector of clause 4, wherein the function at least comprises: a summation function and a hyperbolic tangent function.

Clause 6. The method for generating a feature vector of clause 5, wherein the data information comprises: text information and image information.

Clause 7. The method for generating a feature vector of clause 6, wherein when the data information is image information, the step of extracting a semantic feature from the data information to acquire semantic feature information comprises:

splitting the data information based on a feature of a preset level of the neural network model; and acquiring each piece of split semantic feature information.

Clause 8. The method for generating a feature vector of clause 7, wherein when the data information is image information, the preset function comprises:

a hyperbolic tangent function with a preset feature matrix, and a summation function.

Clause 9. The method for generating a feature vector of clause 7, wherein the step of acquiring a feature vector of the data information by using a preset function, with the semantic feature information as a parameter, comprises:

acquiring a sum of the semantic feature information according to the summation function;

training the sum of the semantic feature information according to the preset feature matrix, to acquire a training result; and acquiring the feature vector of the data information according to the hyperbolic tangent function, with the training result as a parameter.

Clause 10. The method for generating a feature vector of clause 9, wherein before the step of acquiring a sum of the semantic feature information according to the summation function, the method comprises:

acquiring a weight of each piece of the semantic feature information.

Clause 11. The method for generating a feature vector of clause 10, wherein the step of acquiring a weight of each piece of the semantic feature information comprises:

acquiring an intermediate feature variable of each piece of the semantic feature information;

acquiring a training vector of each piece of the semantic feature information by using a preset exponential function, with a product of the intermediate feature variable of each piece of the semantic feature information and a preset first neural parameter as a parameter;

acquiring a sum of the training vectors according to the summation function; and dividing the training vector of each piece of the semantic feature information by the sum of the training vectors, to acquire the weight of each piece of the semantic feature information.

Clause 12. The method for generating a feature vector of clause 11, wherein the preset exponential function comprises: an exponential function with e as the base.

Clause 13. The method for generating a feature vector of clause 11, wherein the preset first neural parameter is acquired by learning and training with a backpropagation algorithm.

Clause 14. The method for generating a feature vector of clause 12, wherein an algorithm for acquiring the weight of each piece of the semantic feature information comprises:

$$\alpha_{v,n}^{(k)} = \frac{\exp(w_{v,n}^{(k)} h_{v,n}^{(k)})}{\sum_{n'=1}^{N} \exp(w_{v,n}^{(k)} h_{v,n'}^{(k)})}$$

wherein the letters v, n represent a specific piece of the semantic feature information, the letter k represents the number of iterations, the letter N represents the total number of pieces of the semantic feature information, n' represents a specific piece of the semantic feature information, the symbol Σ represents the summation function, exp represents the exponential function with e as the base, $w_{v,n}^{(k)}$ represents the preset first neural parameter, $h_{v,n}^{(k)}$ represents the intermediate feature variable, and $\alpha_{v,n}^{(k)}$ represents the weight of each piece of the semantic feature information.

Clause 15. The method for generating a feature vector of clause 12, wherein the step of acquiring an intermediate feature variable of each piece of the semantic feature information comprises:

using a product of each piece of the semantic feature information and a preset second neural parameter as a parameter; and acquiring the intermediate feature variable of each piece of the semantic feature information by using the hyperbolic tangent function.

Clause 16. The method for generating a feature vector of clause 15, wherein after the step of using a product of each piece of the semantic feature information and a preset second neural parameter as a parameter, the method comprises:

normalizing the product of each piece of the semantic feature information and the preset second neural parameter.

Clause 17. The method for generating a feature vector of clause 16, wherein the step of normalizing comprises: a norm L1norm.

Clause 18. The method for generating a feature vector of clause 16, wherein after the step of acquiring an intermediate feature variable of each piece of the semantic feature information, the method comprises:

using a product of a memorized vector and a preset third neural parameter as a parameter; and acquiring a memorized feature variable of the semantic feature information by using the hyperbolic tangent function.

Clause 19. The method for generating a feature vector of clause 18, wherein after the step of using a product of a memorized vector and a preset third neural parameter as a parameter, the method comprises:

normalizing the product of the memorized vector and the preset third neural parameter.

Clause 20. The method for generating a feature vector of clause 19, wherein the step of normalizing comprises: a norm L1norm.

Clause 21. The method for generating a feature vector of clause 19, wherein after the step of acquiring a memorized feature variable of the semantic feature information, the method comprises:

using a product of the intermediate feature variable of the semantic feature information and the memorized feature variable of the corresponding semantic feature information as a new intermediate feature variable of the semantic feature information.

Clause 22. The method for generating a feature vector of clause 21, wherein the preset second and third neural parameters are acquired by learning and training with a backpropagation algorithm.

Clause 23. The method for generating a feature vector of clause 22, wherein an algorithm for obtaining the product of the intermediate feature variable of the semantic feature information and the memorized feature variable of the corresponding semantic feature information comprises:

$$h_{v,n}^{(k)} = \tan h(L1norm(w_v^{(k)} V n)) \otimes \tan h(L1norm(w_{v,m}^{(k)} m_v^{(k-1)}))$$

wherein the letters v, n represent a specific piece of the semantic feature information, the letter k represents the number of iterations, the symbol L1norm represents a norm, tan h represents the hyperbolic tangent function, $w_v^{(k)}$ represents the preset second neural parameter, $w_{v,m}^{(k)}$ represents the preset third neural parameter, $V_n$ represents the semantic feature information, $m_v^{(k-1)}$ represents the memorized feature variable, and $h_{v,n}^{(k)}$ represents the intermediate feature variable.

Clause 24. The method for generating a feature vector of clause 21, wherein the step of acquiring a memorized feature variable of the semantic feature information comprises:
acquiring a sum of the semantic feature information according to the summation function;
acquiring an average of the sum of the semantic feature information according to the number of pieces of the semantic feature information;
training the average of the sum of the semantic feature information according to the preset feature matrix, to acquire a training result; and
acquiring the memorized feature variable of the semantic feature information by using the hyperbolic tangent function, with the training result as a parameter.

Clause 25. The method for generating a feature vector of clause 24, wherein after the step of acquiring a training result, the method comprises:
normalizing the training result.

Clause 26. The method for generating a feature vector of clause 25, wherein the step of normalizing comprises: a norm L1norm.

Clause 27. The method for generating a feature vector of clause 25, wherein after the step of acquiring a memorized feature variable of the semantic feature information, the method comprises:
normalizing the memorized feature variable of the semantic feature information.

Clause 28. The method for generating a feature vector of clause 27, wherein the step of normalizing comprises: a norm L2norm.

Clause 29. The method for generating a feature vector of clause 28, wherein an algorithm for acquiring the memorized feature variable of the semantic feature information comprises:

$$m_v^{(0)} = L2norm\left(\tanh\left(L1norm\left(p^{(0)} \frac{1}{N} \sum_{n=1}^{N} V_n\right)\right)\right)$$

wherein $V_n$ represents the semantic feature information, the symbol Σ represents the summation function, the letter N represents the total number of pieces of the semantic feature information, $p^{(0)}$ represents the preset feature matrix, the symbol L1norm represents a norm, tan h represents the hyperbolic tangent function, and the symbol L2norm represents a norm.

Clause 30. The method for generating a feature vector of clause 27, wherein after the step of acquiring a memorized feature variable of the semantic feature information, the method comprises:
updating the memorized feature variable of the semantic feature information according to the number of iterations.

Clause 31. The method for generating a feature vector of clause 30, wherein the step of updating the memorized feature variable of the semantic feature information according to the number of iterations comprises:
acquiring the feature vector of the data information obtained in the previous iteration; and
updating the memorized feature variable of the semantic feature information according to the feature vector of the data information obtained in the previous iteration.

Clause 32. The method for generating a feature vector of clause 31, wherein an algorithm for acquiring the feature vector of the data information comprises:

$$v^{(k)} = L2norm\left(\tanh\left(L1norm\left(P^{(k)} \sum_{n=1}^{N} \alpha_{v,n}^{(k)} V_n\right)\right)\right)$$

wherein $V_n$ represents the semantic feature information, $\alpha_{v,n}^{(k)}$ represents the weight of each piece of the semantic feature information, the symbol Σ represents the summation function, $p^{(0)}$ represents the preset feature matrix, the symbol L1norm represents a norm, tan h represents the hyperbolic tangent function, and the symbol L2norm represents a norm.

Clause 33. The method for generating a feature vector of clause 6, wherein when the data information is image information and after the step of acquiring data information, the method comprises:
compressing the acquired data information to a preset size.

Clause 34. The method for generating a feature vector of clause 6, wherein when the data information is text information, the step of extracting a semantic feature from the data information to acquire semantic feature information comprises:
performing word segmentation on the text information, to acquire a text vector; and
using the text vector as the semantic feature information.

Clause 35. The method for generating a feature vector of clause 34, wherein when the data information is text information, the preset function comprises:
a hyperbolic tangent function and a summation function.

Clause 36. The method for generating a feature vector of clause 35, wherein the step of acquiring a feature vector of the data information by using a preset function, with the semantic feature information as a parameter, comprises:
acquiring a sum of the semantic feature information according to the summation function, with the semantic feature information as a parameter; and
using the sum of the semantic feature information as the feature vector of the data information.

Clause 37. The method for generating a feature vector of clause 36, wherein before the step of acquiring a sum of the semantic feature information, the method comprises:
acquiring a weight of each piece of the semantic feature information.

Clause 38. The method for generating a feature vector of clause 36, wherein the step of acquiring a weight of each piece of the semantic feature information comprises:

acquiring an intermediate feature variable of each piece of the semantic feature information;

acquiring a training vector of each piece of the semantic feature information by using a preset exponential function, with a product of the intermediate feature variable of each piece of the semantic feature information and a preset fourth neural parameter as a parameter;

acquiring a sum of the training vectors according to the summation function; and dividing the training vector of each piece of the semantic feature information by the sum of the training vectors, to acquire the weight of each piece of the semantic feature information.

Clause 39. The method for generating a feature vector of clause 38, wherein the preset exponential function comprises: an exponential function with e as the base.

Clause 40. The method for generating a feature vector of clause 38, wherein the preset fourth neural parameter is acquired by learning and training with a backpropagation algorithm.

Clause 41. The method for generating a feature vector of clause 39, wherein an algorithm for acquiring the weight of each piece of the semantic feature information comprises:

$$\alpha_{u,t}^{(k)} = \frac{\exp(w_{u,n}^{(k)} h_{u,n}^{(k)})}{\sum_{t'=1}^{T} \exp(w_{v,nu}^{(k)} h_{u,n'}^{(k)})}$$

wherein the letters u, n represent a specific piece of the semantic feature information, the letter k represents the number of iterations, the letter T represents the total number of pieces of the semantic feature information, t' represents a specific piece of the semantic feature information, the symbol $\Sigma$ represents the summation function, exp represents the exponential function with e as the base, $w_{u,n}^{(k)}$ represents the preset fourth neural parameter, $h_{u,n}^{(k)}$ represents the intermediate feature variable, and $\alpha_{u,t}^{(k)}$ represents the weight of each piece of the semantic feature information.

Clause 42. The method for generating a feature vector of clause 41, wherein the step of acquiring an intermediate feature variable of each piece of the semantic feature information comprises:

using a product of each piece of the semantic feature information and a preset fifth neural parameter as a parameter; and acquiring the intermediate feature variable of each piece of the semantic feature information by using the hyperbolic tangent function.

Clause 43. The method for generating a feature vector of clause 42, wherein after the step of using a product of each piece of the semantic feature information and a preset fifth neural parameter as a parameter, the method comprises:

normalizing the product of each piece of the semantic feature information and the preset fifth neural parameter.

Clause 44. The method for generating a feature vector of clause 43, wherein the step of normalizing comprises: a norm L1norm.

Clause 45. The method for generating a feature vector of clause 43, wherein after the step of acquiring an intermediate feature variable of each piece of the semantic feature information, the method comprises:

using a product of a memorized vector and a preset sixth neural parameter as a parameter; and acquiring a memorized feature variable of the semantic feature information by using the hyperbolic tangent function.

Clause 46. The method for generating a feature vector of clause 45, wherein after the step of using a product of a memorized vector and a preset sixth neural parameter as a parameter, the method comprises:

normalizing the product of the memorized vector and the preset sixth neural parameter.

Clause 47. The method for generating a feature vector of clause 46, wherein the step of normalizing comprises: a norm L1norm.

Clause 48. The method for generating a feature vector of clause 46, wherein after the step of acquiring a memorized feature variable of the semantic feature information, the method comprises:

using a product of the intermediate feature variable of the semantic feature information and the memorized feature variable of the corresponding semantic feature information as a new intermediate feature variable of the semantic feature information.

Clause 49. The method for generating a feature vector of clause 48, wherein the preset fifth and sixth neural parameters are acquired by learning and training with a backpropagation algorithm.

Clause 50. The method for generating a feature vector of clause 49, wherein an algorithm for obtaining the product of the intermediate feature variable of the semantic feature information and the memorized feature variable of the corresponding semantic feature information comprises:

$$h_{u,n}^{(k)} = \tan h(L1\text{norm}(w_u^{(k)} V_t)) \otimes \tan h(L1\text{norm}(w_{u,m}^{(k)} m_u^{(k-1)}))$$

wherein the letters u, n represent a specific piece of the semantic feature information, the letter k represents the number of iterations, the symbol L1norm represents a norm, tan h represents the hyperbolic tangent function, $w_u^{(k)}$ represents the preset fifth neural parameter, $w_{u,m}^{(k)}$ represents the preset sixth neural parameter, $U_t$ represents the semantic feature information, $m_u^{(k-1)}$ represents the memorized feature variable, and $h_{u,n}^{(k)}$ represents the intermediate feature variable.

Clause 51. The method for generating a feature vector of clause 49, wherein the step of acquiring a memorized feature variable of the semantic feature information comprises:

acquiring a sum of the memorized feature information according to the summation function, with the semantic feature information as a parameter; and using the sum of the memorized feature information as the memorized feature vector of the data information.

Clause 52. The method for generating a feature vector of clause 51, wherein after the step of acquiring a sum of the memorized feature information, the method comprises:

normalizing the sum of the memorized feature information.

Clause 53. The method for generating a feature vector of clause 52, wherein the step of normalizing comprises: a norm L2norm.

Clause 54. The method for generating a feature vector of clause 53, wherein an algorithm for acquiring the memorized feature variable of the semantic feature information comprises:

$$m_u^{(0)} = L2\text{norm}\left(\sum_{t=1}^{T} U_t\right)$$

wherein $U_t$ represents the semantic feature information, the symbol $\Sigma$ represents the summation function, the letter T represents the total number of pieces of the semantic feature information, and the symbol L2norm represents a norm.

Clause 55. The method for generating a feature vector of clause 54, wherein after the step of acquiring a memorized feature variable of the semantic feature information, the method comprises:

updating the memorized feature variable of the semantic feature information according to the number of iterations.

Clause 56. The method for generating a feature vector of clause 55, wherein the step of updating the memorized feature variable of the semantic feature information according to the number of iterations comprises:

acquiring the feature vector of the data information obtained in the previous iteration; and updating the memorized feature variable of the semantic feature information according to the feature vector of the data information obtained in the previous iteration.

Clause 57. The method for generating a feature vector of clause 56, wherein an algorithm for acquiring the feature vector of the data information comprises:

$$u^{(k)} = L2norm\left(\sum_{t=1}^{T} \alpha_{u,t}^{(k)} U_t\right)$$

wherein $U_t$ represents the semantic feature information, $\alpha_{u,t}^{(k)}$ represents the weight of each piece of the semantic feature information, the symbol $\Sigma$ represents the summation function, and the symbol L2norm represents a norm.

Clause 58. The method for generating a feature vector of clause 6, wherein after the step of acquiring a feature vector of the data information, the method comprises:

acquiring a feature vector of another data information relative to the data information according to the type of the data information.

Clause 59. The method for generating a feature vector of clause 58, wherein after the step of acquiring a feature vector of another data information relative to the data information according to the type of the data information, the method comprises:

calculating a similarity between the another data information relative to the data information and the data information based on the feature vector of the another data information relative to the data information.

Clause 60. The method for generating a feature vector of clause 59, wherein an algorithm for calculating the similarity between the another data information relative to the data information and the data information comprises:

wherein L represents the similarity between the another data information relative to the $$L = \sum \{\max(0, \mu - S(V_{image}^i, V_{text}^j) + S(V_{image}^j, V_{text}^i)) + \max(0, \mu - S(V_{image}^i, V_{text}^j) + S(V_{image}^j, V_{text}^i))\}$$

data information and the data information, max represents taking a maximum value, the symbol $\mu$ represents a similarity threshold, the symbol i represents the data information, the symbol j represents the another data information relative to the data information, $V_{image}$ represents a feature vector of image information, and $V_{text}$ represents a feature vector of text information.

Clause 61. An apparatus for generating a feature vector, comprising:

a data information acquisition unit configured to acquire data information;

a semantic extraction unit configured to extract a semantic feature from the data information to acquire semantic feature information; and a feature vector acquisition unit configured to acquire a feature vector of the data information by using a preset function, with the semantic feature information as a parameter.

Clause 62. The apparatus for generating a feature vector of clause 61, wherein the semantic extraction unit is specifically configured to extract a semantic feature from the data information by using a preset neural network model.

Clause 63. The apparatus for generating a feature vector of clause 62, wherein the semantic extraction unit is specifically configured to extract the semantic feature from the data information by using a ResNet-152 neural network model.

Clause 64. The apparatus for generating a feature vector of clause 62, wherein the feature vector acquisition unit comprises:

a function setting subunit configured to set a function and variables of the function according to the type of the data information; and a feature vector acquisition subunit configured to acquire the feature vector of the data information by using the function, with the semantic feature information as a parameter.

Clause 65. The apparatus for generating a feature vector of clause 64, wherein the function setting subunit is specifically configured to set a summation function and a hyperbolic tangent function according to the type of the data information.

Clause 66. The apparatus for generating a feature vector of clause 65, wherein the data information acquisition unit is specifically configured for text information and image information.

Clause 67. The apparatus for generating a feature vector of clause 66, comprising:

a sample acquisition unit configured to acquire a feature vector of another data information relative to the data information according to the type of the data information, after the feature vector of the data information is acquired.

Clause 68. The apparatus for generating a feature vector of clause 67, comprising:

a similarity calculation unit configured to calculate a similarity between the another data information relative to the data information and the data information based on the feature vector of the another data information relative to the data information, after the feature vector of the another data information relative to the data information is acquired.

Clause 69. An electronic device, comprising:

a processor; and a memory configured to store a program for generating a feature vector, the program performing the following operations when read and executed by the processor: acquiring data information; extracting a semantic feature from the data information, to acquire semantic feature information; and acquiring a feature vector of the data information by using a preset function, with the semantic feature information as a parameter.

Clause 70. A searching method, comprising:

receiving data information from a user;

acquiring a feature vector of the data information;

comparing the feature vector with a feature vector of pre-established data information; and outputting pre-established data information whose feature vector is in a preset threshold range with the feature vector of the data information.

Clause 71. The searching method of clause 70, wherein the data information may be text information or image information.

Clause 72. The searching method of clause 71, wherein the step of acquiring a feature vector of the data information comprises:

acquiring the feature vector of the data information by applying the method for generating a feature vector according to any of clauses 1 to 60.

Clause 73. The searching method of clause 72, wherein the feature vector of the pre-established data information comprises:

a feature vector of image information pre-established by applying the method for generating a feature vector according to any of clauses 1 to 60.

Clause 74. The searching method of clause 73, wherein the step of comparing the feature vector with a feature vector of pre-established data information comprises:

calculating a similarity between the feature vector and the feature vector of the pre-established data information.

Clause 75. The searching method of clause 74, wherein an algorithm for calculating the similarity between the feature vector and the feature vector of the pre-established data information comprises:

$$S(V_{image}, V_{text})$$

wherein $V_{image}$ represents the feature vector of the pre-established data information, and $V_{text}$ represents the feature vector of the input data information.

Clause 76. The searching method of clause 74, wherein the step of outputting pre-established data information whose feature vector is in a preset threshold range with the feature vector of the data information comprises:

outputting the pre-established data information in order of distance to the feature vector.

Clause 77. A searching apparatus, comprising:

a data information receiving unit configured to receive input data information;

a feature vector acquisition unit configured to acquire a feature vector of the data information;

a comparison unit configured to compare the feature vector with a feature vector of pre-established data information; and a data information outputting unit configured to output pre-established data information whose feature vector is in a preset threshold range with the feature vector of the data information.

Clause 78. The searching apparatus of clause 77, wherein the data information receiving unit is specifically configured to receive input text information or image information.

Clause 79. The searching apparatus of clause 78, wherein the feature vector acquisition unit is configured to acquire the feature vector of the data information by applying the method for generating a feature vector according to any of clauses 1 to 60.

Clause 80. The searching apparatus of clause 79, wherein the comparison unit is configured to compare the feature vector with a feature vector of image information pre-established by applying the method for generating a feature vector according to any of clauses 1 to 59.

Clause 81. The searching apparatus of clause 80, wherein the comparison unit is configured to calculate a similarity between the feature vector and the feature vector of the pre-established data information.

Clause 82. The searching apparatus of clause 80, wherein the data information outputting unit is configured to output the pre-established data information in order of distance to the feature vector.

Clause 83. An electronic device, comprising:

a processor; and a memory configured to store a program for outputting data information, the program performing the following operations when read and executed by the processor: receiving data information from a user; acquiring a feature vector of the data information; comparing the feature vector with a feature vector of pre-established data information; and outputting pre-established data information whose feature vector is in a preset threshold range with the feature vector of the data information.

What is claimed is:

1. An apparatus comprising:
   one or more processors; and
   one or more memories storing thereon computer-readable instructions that, when executed by the one or more processors, cause the one or more processors to perform acts comprising:
   acquiring data information;
   extracting a semantic feature from the data information, to acquire a plurality of sets of semantic feature information;
   acquiring a feature vector of the data information by using a preset function, by at least summing the plurality of sets of semantic feature information;
   acquiring a memorized feature variable of the plurality of sets of semantic feature information by at least averaging the sum of the plurality of sets of semantic feature information; and
   updating the memorized feature variable by concatenating the memorized feature variable and the feature vector.

2. The apparatus of claim 1, wherein the extracting the semantic feature from the data information includes:
   extracting the semantic feature from the data information by using a preset neural network model.

3. The apparatus of claim 2, wherein the preset neural network model includes ResNet-152.

4. The apparatus of claim 2, wherein the acquiring the feature vector of the data information using the preset function, includes:
   setting a function and variables of the function according to the type of the data information; and
   acquiring the feature vector of the data information by using the function with the semantic feature information as the parameter.

5. The apparatus of claim 4, wherein the data information includes text information.

6. The apparatus of claim 4, wherein the data information includes image information.

7. The apparatus of claim 5, wherein the extracting the semantic feature from the data information to acquire semantic feature information includes:
   splitting the data information based on a feature of a preset level of the neural network model; and
   acquiring each piece of split semantic feature information.

8. The apparatus of claim 7, wherein:
   the preset function includes a hyperbolic tangent function with a preset feature matrix, and a summation function; and the acquiring the feature vector of the data information by using the preset function includes:
acquiring a sum of the semantic feature information according to the summation function;
training the sum of the semantic feature information according to the preset feature matrix, to acquire a training result; and
acquiring the feature vector of the data information according to the hyperbolic tangent function, with the training result as a parameter.

9. One or more memories storing thereon computer-readable instructions that, when executed by one or more processors, cause the one or more processors to perform acts comprising:
acquiring data information;
extracting a semantic feature from the data information to acquire a plurality of sets of semantic feature information;
acquiring a feature vector of the data information by using a preset function, by at least summing the plurality of sets of semantic feature information;
acquiring a memorized feature variable of the plurality of sets of semantic feature information by at least averaging the sum of the plurality of sets of semantic feature information; and
updating the memorized feature variable of the semantic feature information by concatenating the memorized feature variable and the feature vector.

\* \* \* \* \*